(12) United States Patent
Roopnarine

(10) Patent No.: US 12,202,632 B2
(45) Date of Patent: Jan. 21, 2025

(54) CAPTURE AND DOCKING MECHANISMS FOR SPACECRAFTS

(71) Applicant: Roopnarine, New York, NY (US)

(72) Inventor: Roopnarine, New York, NY (US)

( * ) Notice: Subject to any disclaimer, the term of this patent is extended or adjusted under 35 U.S.C. 154(b) by 182 days.

(21) Appl. No.: 17/744,461

(22) Filed: May 13, 2022

(65) Prior Publication Data

US 2022/0332444 A1 Oct. 20, 2022

Related U.S. Application Data

(63) Continuation-in-part of application No. 17/722,605, filed on Apr. 18, 2022.

(60) Provisional application No. 63/188,173, filed on May 13, 2021, provisional application No. 63/176,573, filed on Apr. 19, 2021.

(51) Int. Cl.
*B64G 1/64* (2006.01)
*B64G 1/36* (2006.01)
*B64G 4/00* (2006.01)

(52) U.S. Cl.
CPC ............... *B64G 1/646* (2013.01); *B64G 1/36* (2013.01); *B64G 4/00* (2013.01); *B64G 2004/005* (2013.01)

(58) Field of Classification Search
CPC .... B64G 1/1078; B64G 1/646; B64G 1/6464; B64G 1/6462; B64G 4/00; B64G 2004/005
See application file for complete search history.

(56) References Cited

U.S. PATENT DOCUMENTS

| 5,174,772 | A | 12/1992 | Vranish |
| 6,969,030 | B1 | 11/2005 | Jones et al. |
| 10,611,504 | B2 | 4/2020 | Halsband et al. |
| 10,850,869 | B2 | 12/2020 | Nicholson et al. |
| 11,104,459 | B2 | 8/2021 | Sorensen et al. |
| 2019/0168395 | A1* | 6/2019 | Hay ....................... H01R 33/00 |
| 2021/0284363 | A1* | 9/2021 | Licciardello ........... B64G 1/402 |

(Continued)

*Primary Examiner* — Tye William Abell
*Assistant Examiner* — Justin Michael Heston

(57) ABSTRACT

A servicing system for on-orbit spacecrafts is disclosed. The system comprises a servicing or host spacecraft configured to perform on-orbit servicing of client spacecrafts. The servicing spacecraft comprises a dedicated, deployable, boom having capture and docking mechanisms. The capture mechanism comprises a plurality of capture arms attached to a grounding structure. In one embodiment, the capture arms are kinematically linked and are free to rotate with respect to the grounding structure using a single actuator, thereby synchronizing the rotation of the arms for any angular displacement of the actuator, thus the arms form a circle that is concentric with the boom axis. In a second embodiment, there are two sets of capture arms, with the arms in each set kinematically linked and independently actuated; thus, the two sets cooperatively form different grasping geometries. Further, the docking mechanism is configured to enable the host spacecraft to dock with the client spacecraft. The servicing spacecraft may also be configured to carry a robotic arm and a suite of end-effectors that can be automatically changed out on-orbit. The suite of end-effectors may include one configured with the disclosed capture mechanism, and another may be configured with the disclosed docking mechanism.

18 Claims, 25 Drawing Sheets

(56) References Cited

U.S. PATENT DOCUMENTS

| | | | |
|---|---|---|---|
| 2021/0309397 A1* | 10/2021 | Papantoniou | B64G 1/242 |
| 2022/0089301 A1* | 3/2022 | Gregory | B64G 1/402 |

\* cited by examiner

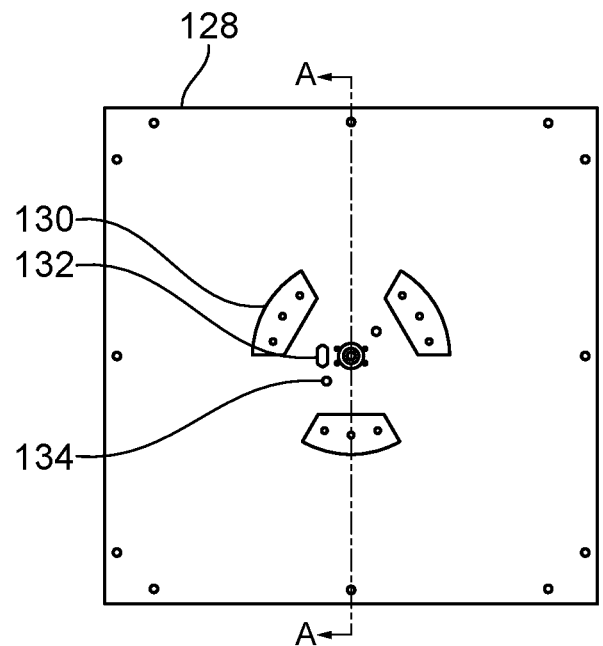
FIG. 6A
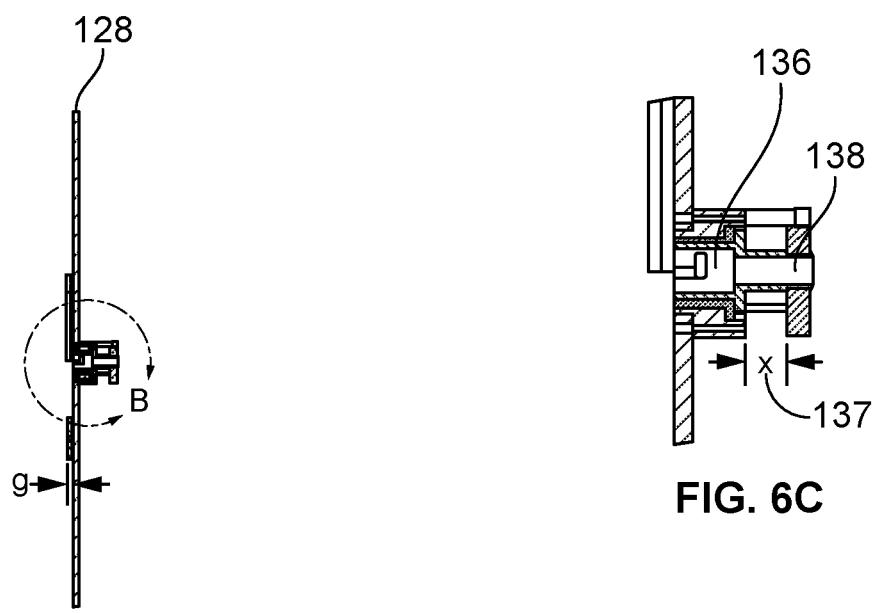
FIG. 6B
FIG. 6C

CAPTURE AND DOCKING MECHANISMS FOR SPACECRAFTS

CROSS REFERENCE TO RELATED APPLICATIONS

This application claims benefit of U.S. Provisional Application No. 63/176,573 filed on Apr. 19, 2021 and U.S. Provisional Application No. 63/188,173 filed on May 13, 2021. The entire contents of Application Nos. 63/176,573 and 63/188,173 are hereby incorporated by reference.

BACKGROUND OF THE INVENTION

A. Technical Field

The present invention generally relates to the design of a system, comprising multiple subsystems. More specifically, the present invention relates to capture and docking systems, that will enable the servicing (repair, de-orbit, salvage, refuel, etc.) of spacecrafts that are orbiting the earth. As used in the disclosure, "capture" or "capturing" refers to grasping or grabbing hold of one vehicle by another vehicle, and "dock" or "docking" refers the process of forming a mechanical and electrical connection between the two vehicles.

B. Description of Related Art

The ability to assemble, repair, and service on-orbit space assets would realize a key capacity for interplanetary exploration. It would also have significant near-term commercial applications. Spacecraft owners may spend over $1B to build and launch a spacecraft and in rare exceptions, like the Hubble space telescope, these spacecrafts will never be serviced. US government agencies have supported various servicing missions but often at great expense and complexity as most spacecrafts are not designed with on-orbit servicing in mind.

Commercial spacecraft, in particular those in the communications industry, may regularly generate $500 k-$1M per day in revenue so even relatively simple life extension can add tremendous value. Satellites with faulty deployments such as a solar array on antenna may be a total loss, incapable of performing their primary mission, often at the cost of an insurance company. Payouts in excess of $100M are not uncommon. In these instances, on-orbit repair or life extension services, as there are no other options, may be of significant interest to satellite owners and operators.

For these reasons, there is a need for the system disclosed herein, modular, with standardized interfaces, and that can be made compatible with low-cost, ride share launch systems.

SUMMARY OF THE INVENTION

The present invention generally discloses servicing systems for spacecraft. Also, the present invention discloses an innovative and intelligent solution that provides capture and docking systems, that will enable the servicing (repair, de-orbit, salvage, refuel, etc.) of spacecrafts that are orbiting the earth.

According to the present invention, the disclosed system provides a means for performing on-orbit servicing of spacecraft. It features mechanisms that enable a host (or servicing) spacecraft (hereafter, S1) to capture and dock with the spacecraft to be serviced (hereafter, S2) and a robotic (manipulator) arm that can provide repairs, change-outs, etc.

In one embodiment, the spacecraft servicing system comprises a servicing spacecraft or host spacecraft configured to perform on-orbit servicing of client spacecraft. In one embodiment, the servicing spacecraft comprises a dedicated boom having a capture mechanism at its end and a compression spring configured to slightly preload the electromagnets in their nominal position. The capture mechanism comprises one or more electromagnets spaced apart and suspended on a frame that allows for some spherical displacements as a way of compensating for any out of plane misalignments during capture. In one embodiment, the client spacecraft includes a striker plate that covers an area larger than the footprint of the capture mechanism. The electromagnets attract the striker plate to capture the client spacecraft for providing on-orbit service. The spacecraft servicing system further comprises a manipulator arm or robotic arm configured to position/align the captured client spacecraft for docking, thereby permitting a very flexible, larger, capture envelope and reducing operational complexity.

In one embodiment, the client spacecraft comprises a standard client interface (SCI) having a BNC-styled receptacle to mate with a docking probe; an electrical connector half coupled with the opposite half on the docking interface plate; one or more striker plates to dock with the client spacecraft, and one or more alignment holes to guide one or more alignment pins during docking in order to compensate for any misalignment along a roll axis.

In one embodiment, the interface includes three discrete pads spaced in an array that nominally matches the spacing on the electromagnets. The discrete pads' dimensions are determined to allow capturing with the maximum possible misalignment between the host and client spacecrafts within the capture envelope or zone. The capture envelope is determined by a sensor system used to rendezvous and bring the spacecrafts together for proximity operations, and the ability to control movement of the host spacecraft.

The electromagnets induce out of plane positional corrections. The electromagnets include one or more sensors for sensing the flux density flowing through a yoke of the magnetic circuit. The electromagnets enable the release and separation of the two spacecrafts after servicing. The boom further comprises a docking mechanism configured to dock the host spacecraft with the client spacecraft.

The docking mechanism has four degrees of freedom and is recessed below the plane of the electromagnets of the capture mechanism in the stowed position. In one embodiment, the docking mechanism is mounted on two linear slides or stage and driven independently for compensating misalignment on the plane of the striker plate. The docking mechanism includes an electrical connection to the client spacecraft configured to perform diagnostic tests, extract or exchange data, etc.

The spacecraft servicing system uses a bayonet-styled coupling system or BNC-styled receptacle to permit the transfer of torques to roll the client spacecraft about the longitudinal axis of the boom, thereby permitting the boom to position the periphery of the client spacecraft in any location to facilitate a repair task by the manipulator arm. The bayonet-styled coupling system allows relative motions of the host spacecraft by rotating the coupling half during docking that produces motion internal to the coupling half of the client spacecraft. The relative motion allows for potential mating of connectors to provide fully mated, leakproof connection to enable re-fueling of the client spacecraft.

The manipulator arm is equipped with various collision avoidance sensors. The manipulator arm is paired with a number of end effectors to perform specific repair tasks. The manipulator arm comprises a sensor and vision system configured to locate potential attachment joints on the client spacecraft. The host and client spacecrafts are unlocked or separated by rotating the docking probe in the reverse direction which resets the internal mechanisms on client spacecraft. The compression spring exerts a force on the client spacecraft to enable physical separation of the two spacecrafts.

In a preferred embodiment, a spacecraft servicing system of a capture and docking mechanisms for spacecrafts are disclosed. The system comprises a servicing spacecraft or host spacecraft configured to capture a client spacecraft. The servicing spacecraft comprises a dedicated boom integrated with a capture mechanism and a docking mechanism at its end. The capture mechanism comprises a plurality of capture arms attached to a grounding structure. The plurality of capture arms is free to rotate with respect to the grounding structure using a single actuator or motor driving a gear that drives smaller gears that are coupled to the arm shafts, thereby synchronizing the rotation of the arms for any angular displacement of the driver gear, driven gears, and thus the arms form a circle that is concentric with the driver gear. Further, the docking mechanism is configured to enable the host spacecraft to dock with the client spacecraft.

In one embodiment, the client spacecraft comprises a standard client interface (SCI) having a BNC-styled receptacle to mate with a docking probe; an electrical connector half coupled with the opposite half on the docking interface plate; one or more capture rings or pads to dock with the client spacecraft, and one or more alignment holes to guide one or more alignment pins during docking in order to compensate for any misalignment along a roll axis.

In one embodiment, the interface includes three discrete pads with an axial offset that are equally spaced in an array and concentric with the docking interface. In one embodiment, the pads may be ferromagnetic in order to be compatible with an electromagnetic capturing system. In one embodiment, the discrete pads' dimensions are determined to allow capturing with the maximum possible misalignment between the host and client spacecrafts within the capture envelope or zone. In one embodiment, the capture envelope is determined by a sensor system used to rendezvous and bring the spacecrafts together for proximity operations, and the ability to control movements of the host spacecraft.

In one embodiment, the capture mechanism is used as an end-effector that enables grasping and manipulation of the client spacecraft or its elements. In one embodiment, the capture arms include one or more proximity sensors that are capable of detecting the edges of the capture ring, thereby assisting to map or confirm the location of the center of the capture ring relative to the center of the boom. In one embodiment, the system further comprises an assembly located between the boom and the spacecraft structures that allows for motion in an XY (Cartesian) plane that is perpendicular to the main or longitudinal axis of the boom, thereby compensating the misalignments in the XY plane during capturing. In one embodiment, the docking mechanism has up to five actuators and is normally recessed below the plane of the capture arms of the capture mechanism in a stowed position.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and structures disclosed herein. The description of a method step or a structure referenced by a numeral in a drawing is applicable to the description of that method step or structure shown by that same numeral in any subsequent drawing herein.

FIGS. 6A-6C show capture interface on the client spacecraft in one embodiment of the present invention.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

In general, the disclosed system 100 provides a means for performing on-orbit servicing of spacecrafts. It features mechanisms that enable a host (or servicing) spacecraft (hereafter, S1) 102 to capture and dock with the spacecraft to be serviced (hereafter, S2) 104 and a robotic (manipulator) arm 108 that can provide repairs, change-outs, etc. FIGS. 1-16 exemplarily illustrates the working of spacecraft servicing system, according to different embodiments of the present invention.

Figure 1:
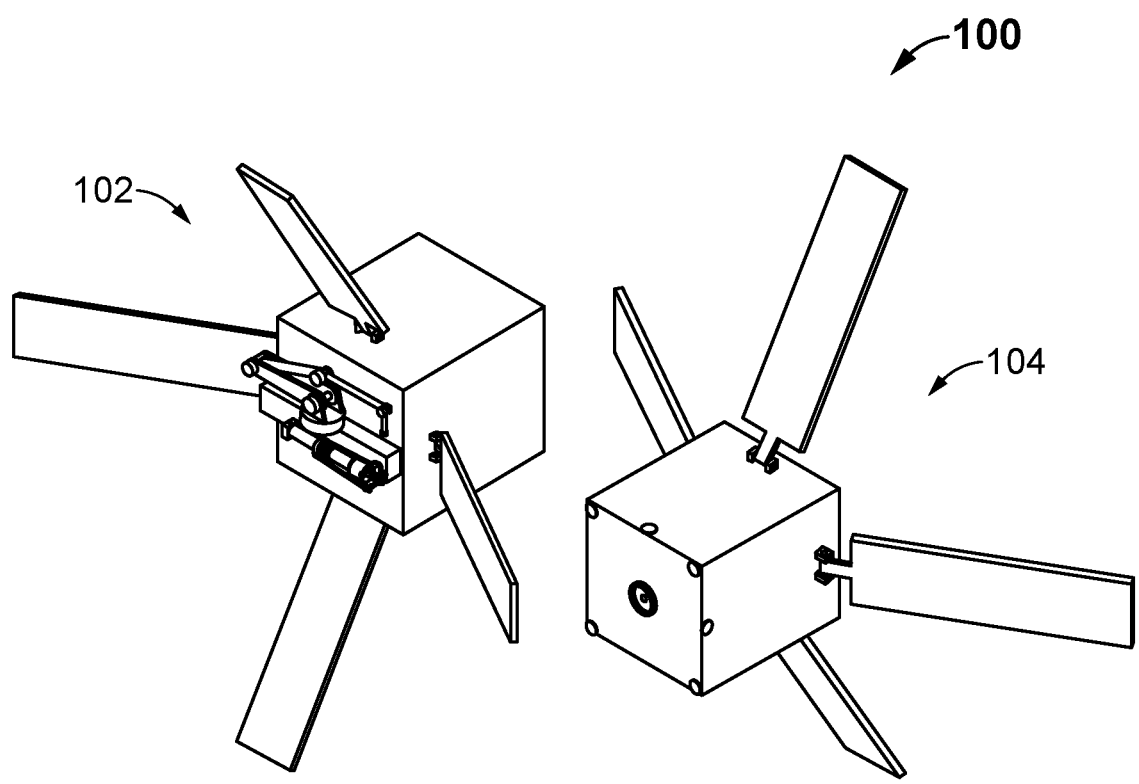
FIG. 1 shows a nominal configuration of two spacecrafts of a servicing system in an embodiment of the present invention.

Referring to FIG. 1, a nominal configuration of the two spacecrafts (102 and 104) of the servicing system 100, is illustrated. In the figures showing S1 102, the manipulator arm 108 is depicted in a stowed position (it will be recognized that a number of orientations of the arm are possible); in this position, the tool change mechanism will be pre-loaded to a ground (spacecraft) structure which is not shown.

Figure 2:
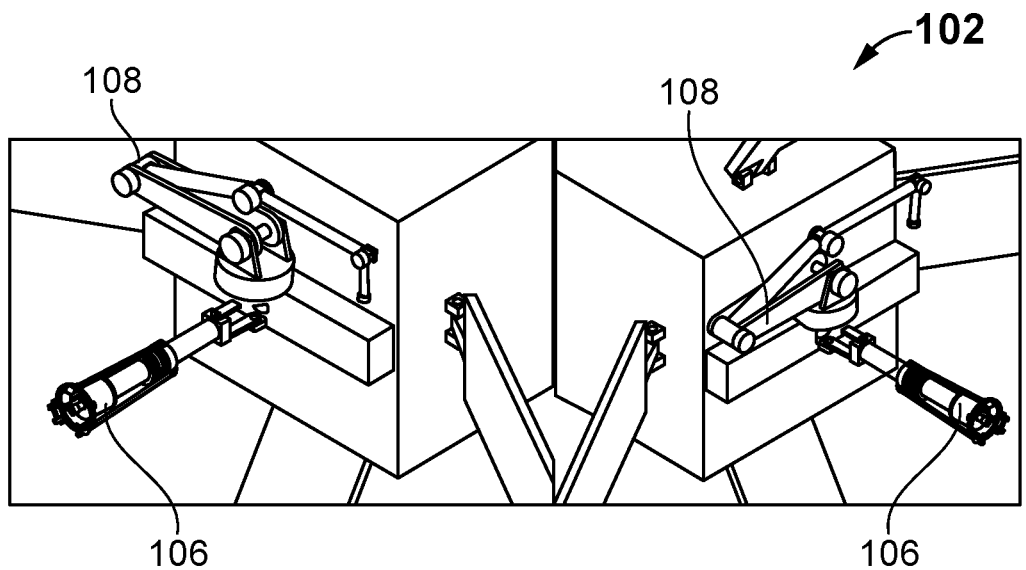
FIG. 2 shows an enlarged view of a servicing spacecraft or host spacecraft (S1) in one embodiment of the present invention.
Figure 3:
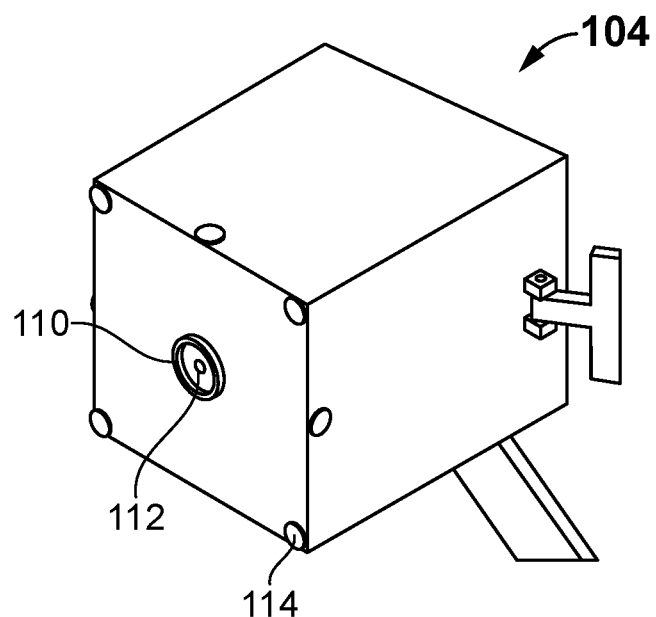
FIG. 3 shows an enlarged view of a serviced spacecraft or client spacecraft (S2) in one embodiment of the present invention.

Referring to FIGS. 2 and 3, an enlarged view of the host spacecraft 102 and client spacecraft, S2 104 of the servicing system 100 respectively, is illustrated. It will be evident that the disclosed system 100 has the following novel features and advantages over the state-of-the-art each of which will enable it to be simpler and lightweight: The system 100 is kinematically simple, serially configured, with robot arm. The system 100 comprises a capture mechanism that is independent of a docking mechanism and vice-versa. The elimination of the need for guidance cones in order to either capture or dock, which take up volume and increase mass. The use of the manipulator arm 108 to position (align) the captured spacecraft for docking, permits a very flexible, larger, capture envelope and reduces operational complexity. The system 100 incorporates re-fueling capability into the docking mechanism to eliminate the need for hose management, etc. There is no need for active (motorized) components to capture or dock on the spacecraft to be serviced, S2. The use of the manipulator arm 108 to deploy the capture/docking boom 106 eliminates the need for active deployment mechanisms on the boom 106. Incorporation of a roll axis about the boom 106 which increases the work envelope or reach of the manipulator arm 108 without adding complexity. Further, the servicing vehicle, S1 102 may be packaged for ride-share capability with the ESPA payload adapter. To emphasize, each of the items above is unique to the disclosed servicing system 100 and taken together, represents an ambitious and comprehensive approach to on-orbit servicing.

Figure 4:
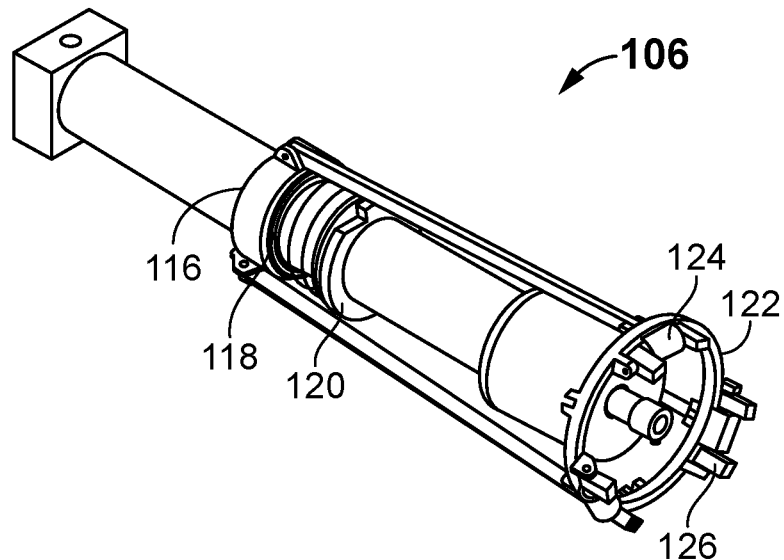
FIG. 4 shows a capture mechanism of a boom in one embodiment of the present invention.
Figure 5:
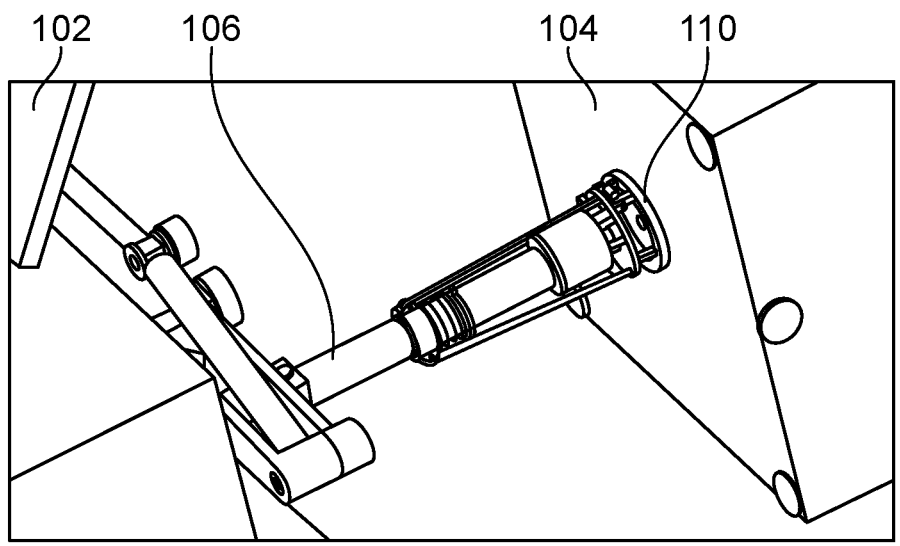
FIG. 5 shows the two spacecrafts in a captured position in one embodiment of the present invention.

Capture:

In order for any servicing to occur, the host spacecraft, S1 102 needs to first capture the client spacecraft, S2 104, to be serviced. For this purpose, the host spacecraft S1 102 carries a dedicated boom that is deployed on orbit. At the end of the boom 106 is the capture mechanism as shown in FIG. 4. The capture mechanism is comprised of 3 electromagnets spaced, ideally, 120 degrees apart. The electromagnets are suspended on a frame 122 that allows for some spherical displacements as a way of compensating for any out of plane misalignments during capture.

The boom 106 comprises a spherical "rod end" bearing 116 and a spring preload collar 120. A compression spring 118 is used to lightly preload the electromagnets in their nominal position. Alternatively, three tension springs, attached to the frame 122, can be used for the same purpose. Additionally, flex pivots or flexures (not shown in figures) are used to preload the coil 124 or yoke assembly 126 of the electromagnets such that, if the assembly approaches the striker plate 110 (shown in FIG. 3) out of plane, the magnetic poles will self-align to be perpendicular to the striker plate 110. The striker plate 110 is located on the client spacecraft, S2 104 and may be annular in construction; however, to reduce mass, it may simply be discrete pads 130 as shown in FIG. 6A, equal in number to the electromagnets and arrayed similarly. The striker plate (this reference hereafter, refers to the discrete pads or a single annular plate) 110 may cover an area larger than the footprint of the capture mechanism, that is, the arrayed electromagnets, in order to allow for imprecise or misaligned capturing.

The dimensions of the annular area of the striker plate 110 are an important factor in providing position information and guidance for capture. The striker plate 110 is made from a magnetic material such that the energized electromagnets induce an attractive force on the striker plate 110 and thus the spacecraft to be captured. The boom 106 may be deployed by active (motorized, springs; not shown in figures) or a passive means. The latter can only occur if the host spacecraft 102 includes a manipulator arm 108, described later, which will be used to deploy the boom 106. In all scenarios, once the boom 106 is deployed, it is locked or latched in position (these features are not depicted in the figures).

The electromagnet-based capture mechanism/system relies on state-of-the-art sensing systems to rendezvous the spacecrafts and to bring them into a close enough alignment and proximity for the capture system to be effective. Once the spacecrafts (102 and 104) are in close enough proximity to enable capture, it is anticipated that the subsequent operation can be done automatically and without imparting any disorienting impulses on either spacecraft.

In order to reduce power consumption, the function of the electromagnets for and during capture may be replaced by permanent magnets; however, the electromagnets will be used to enable the release and separation of the two spacecrafts (102 and 104) after servicing. During capture, the electromagnets are also used to induce out of plane positional corrections, in either scenario. Regardless of the configuration used, permanent or electromagnet, the magnetic capture system may include a means for sensing the flux density flowing through the yoke 126 of the magnetic circuit. Normally, these sensors (for example, hall effect sensors) will all have identical measurements; when brought into near contact (near capture) with striker plate 110, unless the magnetic poles are normal to the striker plate 110, the sensed flux density values will differ. These measurements can be used in conjunction with other alignment sensors to globally adjust the position of the host spacecraft, S1 102 with respect to the striker plate 110 of the client spacecraft, S2 104 or, they can be used to make adjustments to the capture assemble locally (that is, with respect to the boom). In the latter case, increasing and/or decreasing the power into the three electromagnets, independently, will produce the desired adjustments and this can be done automatically by using a feedback loop.

Capture Interface:

As noted above, capturing of the client spacecraft, S2 104 by host spacecraft 102 is accomplished by an interface 112 (shown in FIG. 3) located on client spacecraft, S2 104. This interface 112 could be made into a standardized feature on spacecrafts in order to allow for the possibility of on-orbit servicing. The client spacecraft, S2 104 further includes one or more possible attachment points 114 to the manipulator arm 108. In one embodiment, the interface 112 includes three discrete pads 130 (shown in FIG. 6A) that are ferromagnetic, spaced in an array that nominally matched the spacing on the electromagnets. The dimensions of the pads 130 are determined so as to allow capturing with the maximum possible misalignment between the two spacecrafts (102 and 104), that is, within the capture envelope or zone. The capture envelope, in turn, is determined by the sensor system used to rendezvous and bring the spacecrafts (102 and 104) together for proximity operations, and the ability to control movements of the servicing spacecraft, S1 102.

The pads 130 may be offset to project from the plane of the spacecraft's structure 128, distance "g", they are mounted on; in this configuration, the gap, g, between the pad 130 and the structure creates another interface to which docking, and capturing, is possible. Specifically, a three-pronged grapple can be inserted into the space between the pads 130, once they are below the capture surface and in gap g, between the pads 130 and spacecrafts, rotating these prongs will essentially capture the spacecraft. Additional rotation of the grappling prongs, will preload the connection between the two spacecrafts. This feature may be particularly useful to permanently attach a payload, an avionics box, for example, to client spacecraft, S2 104. If the capturing mechanisms are grappling, rather than electromagnet, then there is no need for a ferromagnetic, striker plate 110, and the only features that matter are those that will enable the grappling mechanism to interface and lock.

In one embodiment, a further modification to the striker plate 110, whether an annular plate or discrete pads 130, may be instituted in order to achieve rotational alignment between the two spacecrafts (102 and 104). This embodiment will include projections from the striker plate 110 that may be considered "teeth" as in the salient poles of an electric motor. Similarly, the electromagnet may be considered as having two salient poles; thus, energizing the electromagnet and moving it into close proximity with the striker plate will produce a torque on the client spacecraft. S2 104, that will seek to align the poles on the two spacecrafts (102 and 104). This feature will, therefore, automatically compensate for rotational misalignments during capture.

Another arrangement of the striker plate 110 is that in which it is embedded to the flush with, or recessed into, the surface of the plane on which it is mounted. While this configuration eliminates the possibility of using grappling prongs to dock and capture the spacecraft, the ability to have the salient poles described above will remain.

Figure 7:
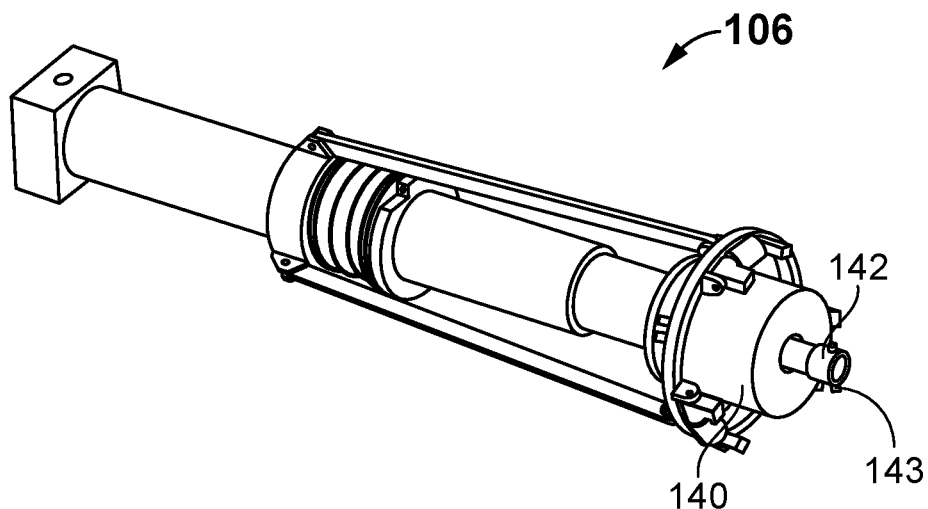
FIG. 7 shows the boom with an extended docking mechanism in one embodiment of the present invention.

Docking:

In addition to the capture mechanism, also located on the boom 106 is a mechanism that enables host spacecraft, S1 102 to dock with client spacecraft, S2 104; this is separate from the capture mechanism. Docking is accomplished when the boom 106 on host spacecraft, S1 102 is engaged with a threaded interface 138 on the client spacecraft, S2 104; this interface may be concentrically located with the center of the striker plate 110 used for capture but an offset is also possible. Detail B, FIG. 6, shows a cross-section of the docking elements on the client spacecraft, S2 104. The docking mechanism may have four degrees of freedom and is normally recessed below the plane of the electromagnets of the capture mechanism in the stowed position. The first degree of freedom is an axial translation, along the length of the boom 106, the second, which may be eliminated, is a rotation or roll about the same axis and the third and fourth are orthogonal translational movements in a plane (X, Y) that is perpendicular to the roll axis. The axial translational motion drives the docking or coupling mechanism into a position beyond the capture mechanism, as shown in FIG. 7, in which it can engage with the other half of the docking mechanism on the client spacecraft, S2 104.

Figure 8:
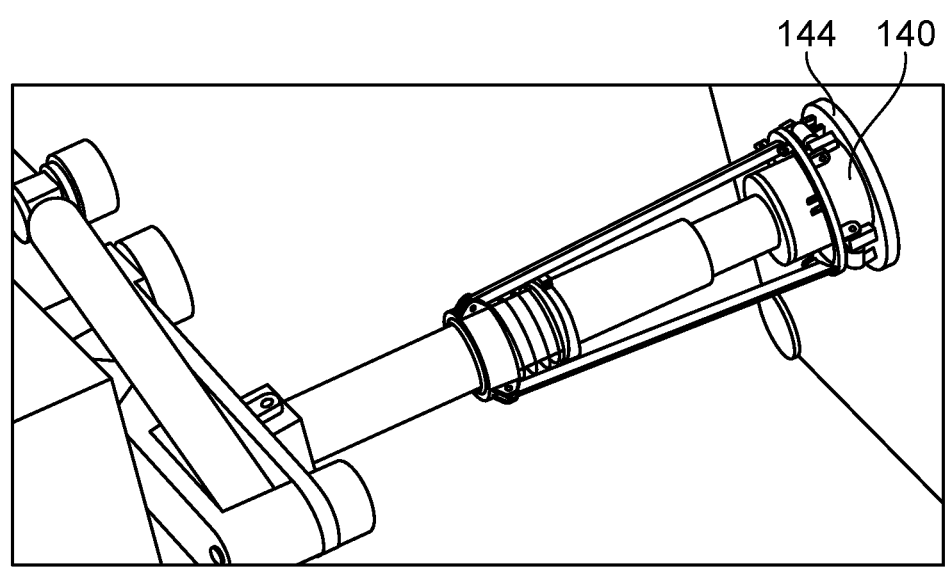
FIG. 8 shows the spacecrafts in the docked position in one embodiment of the present invention.

Referring to FIG. 8, the two spacecrafts (102 and 104) are in docked position, is illustrated. In this embodiment, the docking mechanism 140 is in extended position, which creates a gap 144 between the electromagnets' yoke and the striker plate 110. To enable docking, the electromagnets of the capture mechanism will be energized (or alternatively, when it is included, the manipulator arm 108 on the host spacecraft, S1 102 may position the client spacecraft, S2 104 for docking, after it has been captured); once docking is completed, the electromagnets are de-energized. There are a number of ways in which the vehicles can be docked or held together, for example, using spring loaded detents or latches that, potentially, interface 138 with the gap g, of FIG. 6C or any of the peripheral surfaces of the striker plate. The preferred approach, however, is to use a bayonet-styled coupling system (as in a BNC connector) 136. The bayonet connection 136 can also be designed to permit the transfer of torques to roll S2 about the longitudinal axis of the boom 106, if this feature is desired. This, in turn, will permit the boom 106 to position the periphery of S2 104 in any location to facilitate a repair task by the manipulator arm 108. The X, Y movements allow for compensation of misalignments in the plane of the striker plate 110, for example, when the capture mechanism is not aligned with the docking feature on the client spacecraft, S2 104. X, Y movements are accomplished by mounting the docking mechanism on two linear slides, or stage, and driving (motorizing) each independently. Another possible configuration of the various axis is one in which only one of the X or Y axis is present; in this case, a roll axis about the boom axis must be present.

Internal to the bayonet-styled connection 136 are additional mechanisms; specifically, rotation of the S1 coupling half during docking will produce motion internal to the coupling half of S2 which could be a cam/follower action or more simply, a nut and threaded stud engagement as shown in FIG. 66. These relative motions will be used to, potentially, mate connectors but more specifically, to open port(s) and a fully mated, leakproof, connection that enables refueling of the client spacecraft, S2 104. One way to transfer fuel across the connection would be by centrally locating, in the docking mechanism, a means of connecting to a refuel supply line on the client spacecraft, S2 104. This line will be flexible (a hose, for example) or otherwise be articulated in order to enable the boom to be stowed. In this arrangement, there will be no need to separately manage a refueling hose or the like which further reduces complexity and mass.

Figure 9:
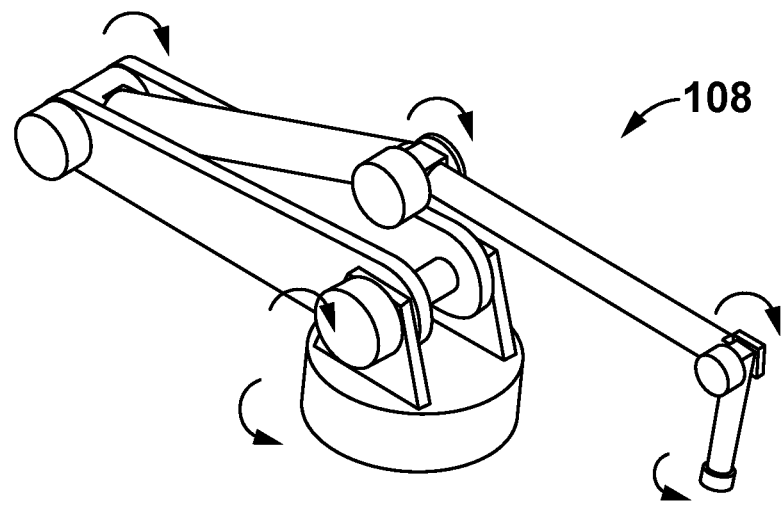
FIG. 9 shows a manipulator arm in one embodiment of the present invention.
Figure 10:
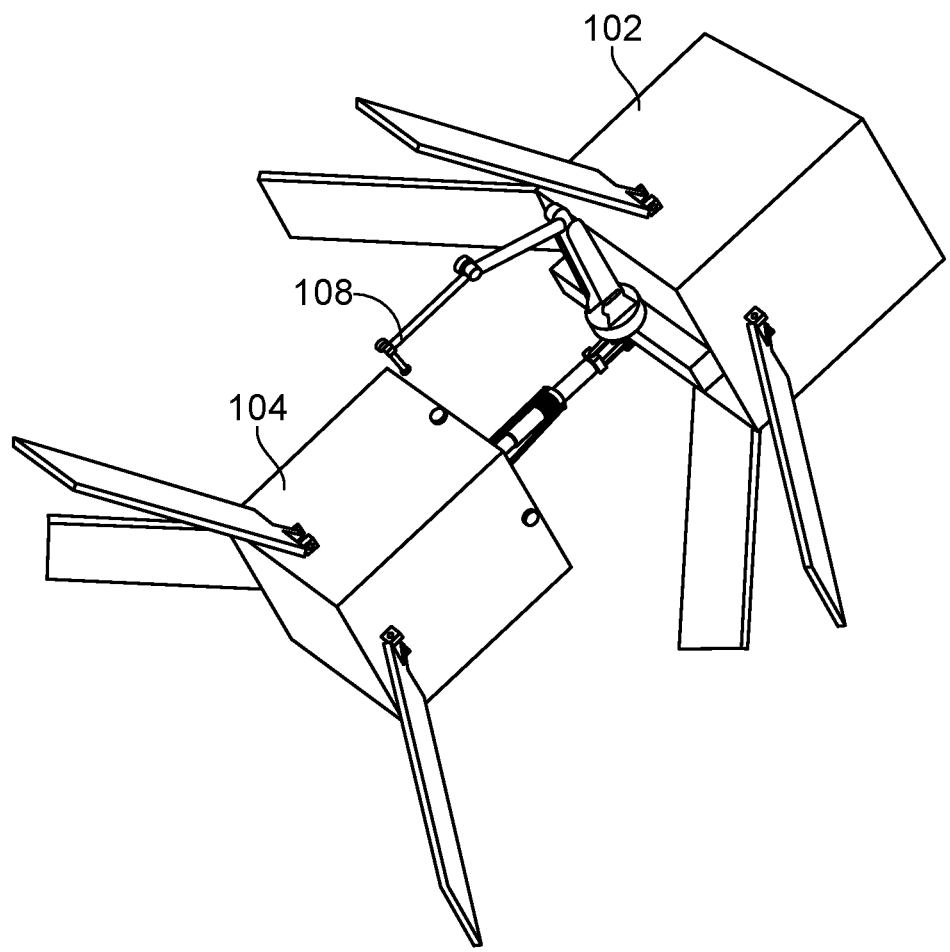
FIG. 10 shows the docked spacecrafts with manipulator arm to perform a task in one embodiment of the present invention.
Figure 11:
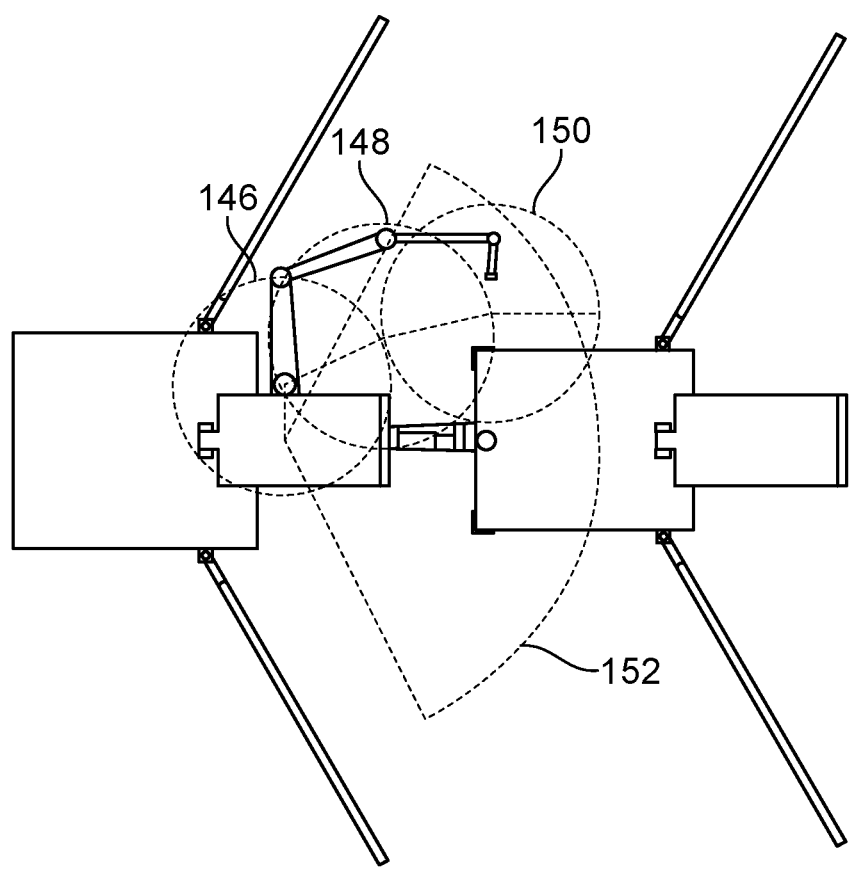
FIG. 11 shows an arm reach envelope in one embodiment of the present invention.
Figure 12:
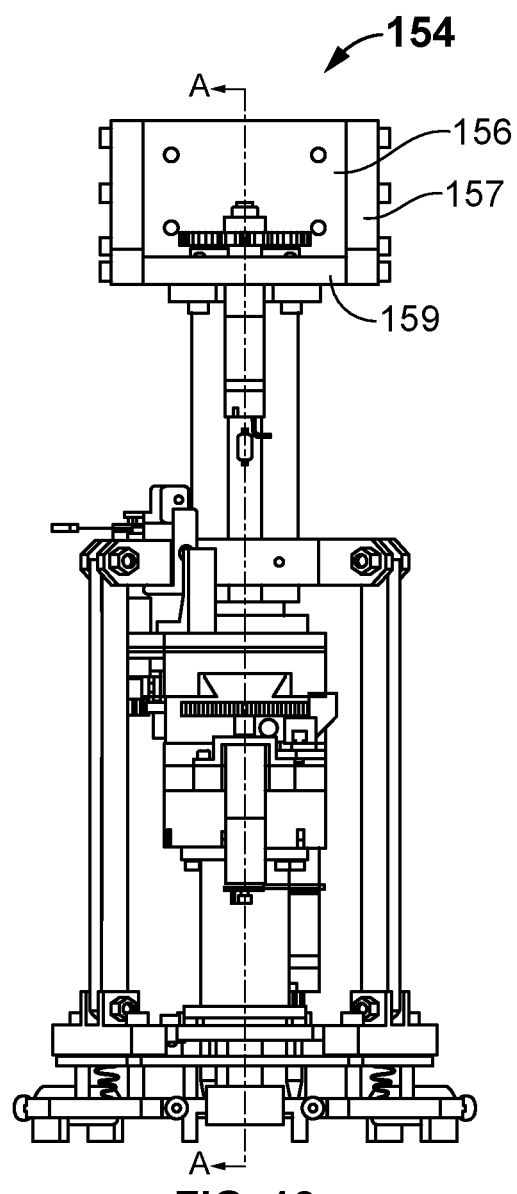
FIGS. 12-16 show various views of the servicing system in one embodiment of the present invention.
Figure 13:
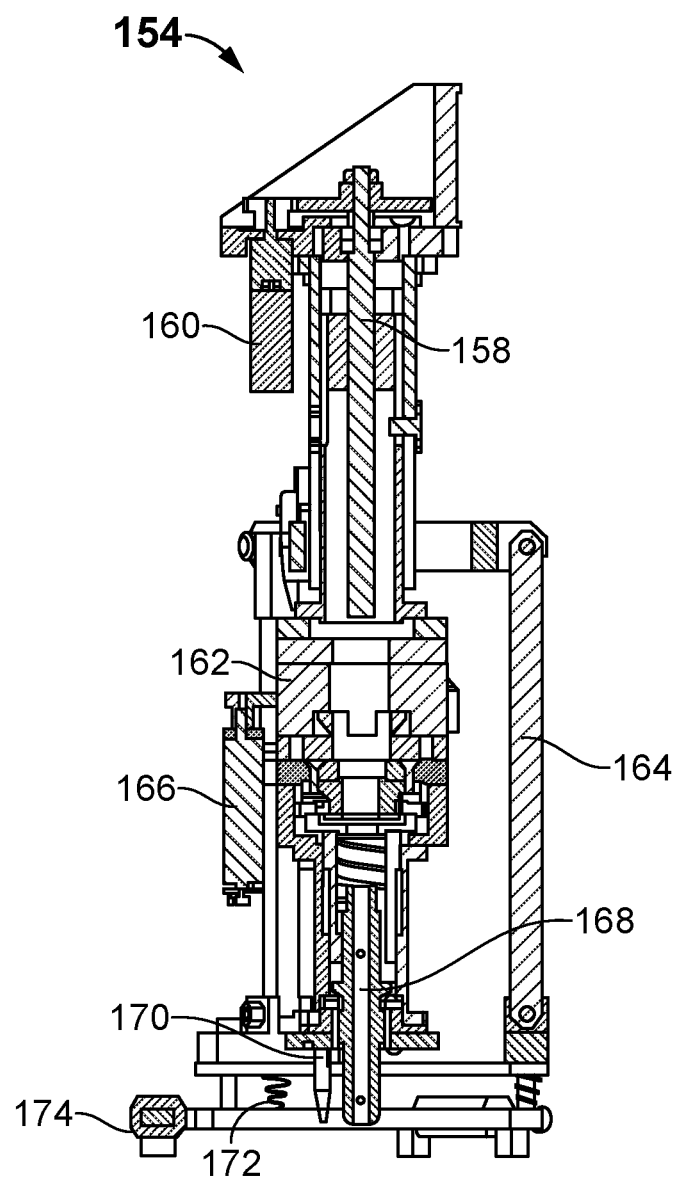
Figure 14:
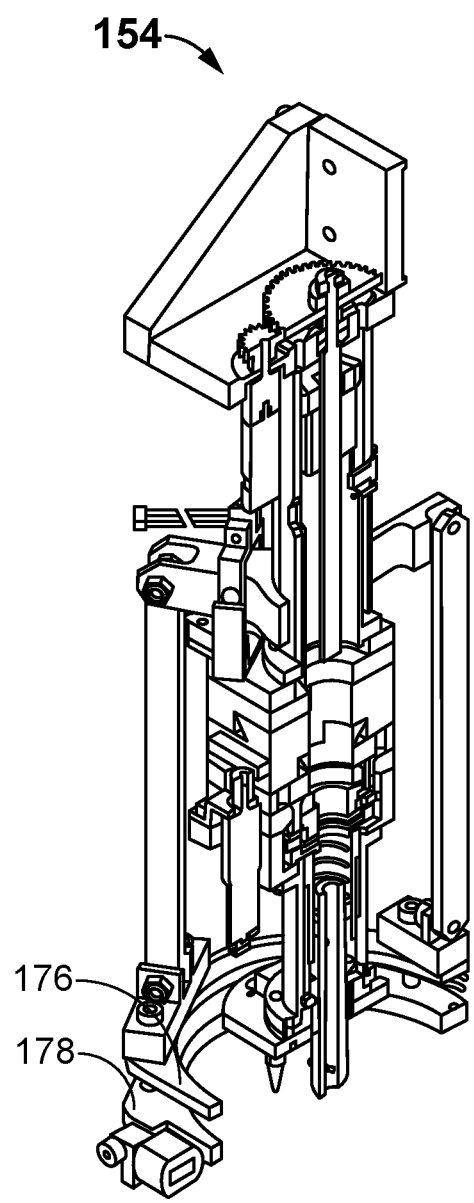
Figure 15:
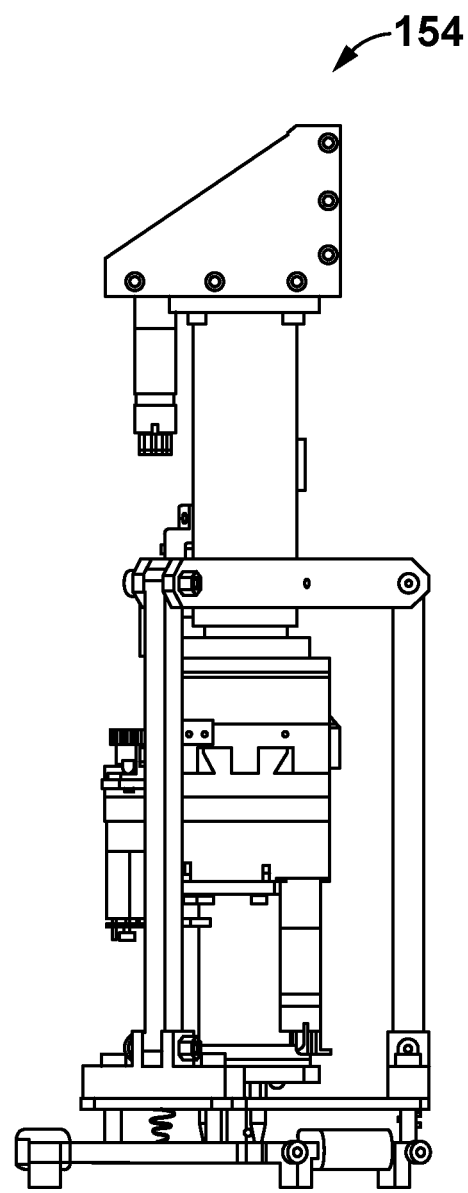
Figure 16:
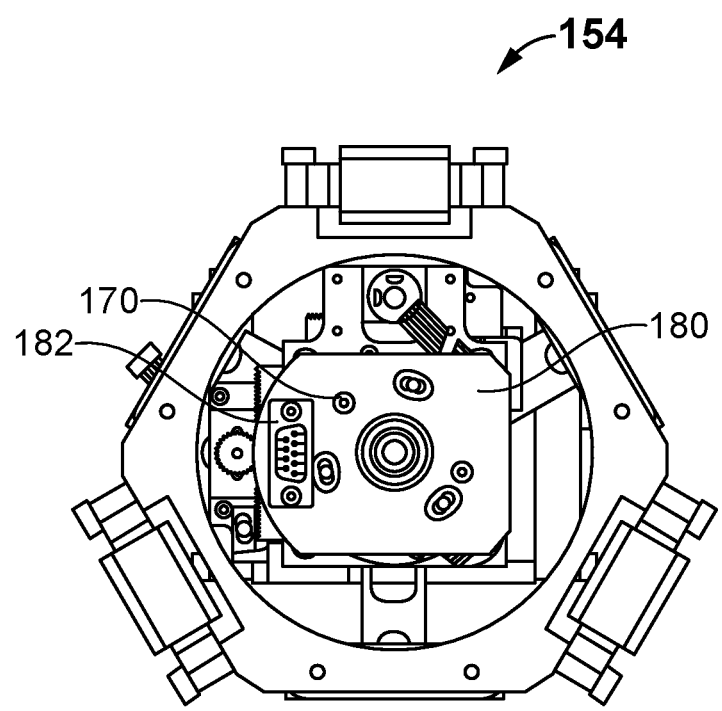

Manipulator Arm:

FIGS. 9-11 exemplarily illustrates the operation of the manipulator arm 108, is illustrated. In the simplest configuration of the host spacecraft, S1 102, a manipulator arm 108 is included. FIG. 9 shows a possible configuration of a six degree of freedom arm with arrows indicating the possible motions (146, 148, 150, and 152) at the six joints (it should be understood that the arrows indicate movement in both directions about the identified axes). The manipulator arm 108 is equipped with various collision avoidance sensors and may incorporate hardstop features to prevent it from damaging its host spacecraft, S1 102.

As depicted in FIG. 9, the manipulator arm 108 has the familiar, conventional, layout of a robot and as such, its kinematics is well known and defined for simple operations; again, reducing complexity. This is in direct contrast to the state-of-the-art. Clearly many variations on the geometric layout and location of the arm on S1 102 are possible. Ultimately, the manipulator arm 108 is paired with a number of end effectors each of which is designed to perform specific repair tasks. These end effectors are stored in a suite of holsters from which they can be retrieved and stowed by the manipulator arm 108. In one embodiment, the manipulator arm 108 is equipped with a tool-change mechanism that interfaces with the various end effectors each of which has a common interface for compatibility. Located in various positioned on the client spacecraft, S2 104 are interfaces 112 (depicted in FIG. 3) that are identical to that on the end effectors; which enables the manipulator arm 108 on the host spacecraft, S1 102 to "grab" or hold the client spacecraft, S2 104; if needed.

In one embodiment, a sensor and vision system on the manipulator arm 108 will be used to locate potential attachment joints on the client spacecraft, S2 104. If the alignment of the mating elements on the spacecrafts (102 and 104), after capture, does not permit their engagement, the client spacecraft, S2 104 can be re-positioned by the manipulator arm 108 in order to achieve alignment and therefore, docking. This repositioning will follow a sequence in which the manipulator arm 108 on the host spacecraft, S1 102 takes hold of the client spacecraft, S2 104 in a hand off from the capture mechanism. The deployed boom 106 is at a fixed reference with respect to the manipulator arm 108; consequently, the manipulator arm 108 is able to position the client spacecraft, S2 104 in an optimum alignment location to permit docking. This operational feature may be useful in order to reduce complexity associated with the initial alignment of the two vehicles and the capture of the client spacecraft, S2 104. This attribute of the system may be useful in that it greatly expands the capture zone (defined by the striker plate) by simply increasing the size of the striker plate 110.

FIG. 10 depicts the manipulator arm 108 in the deployed (that is, not stowed) position in which it is ready to perform any repair task; an end effector is not shown. FIG. 11 shows the possible work envelope for this specific configuration.

To reiterate, the docking mechanism may include the ability to roll S2 about the boom 106. This feature dramatically increases the reach of the manipulator arm to any surface on the periphery of the spacecraft without increasing the complexity of the manipulator arm 108 itself. If need be, the translational axis degree of freedom of the boom 106 may be implemented to further increase the reach of the manipulator arm 108 but this may be redundant in that the several geometries of the manipulator arm 108 and boom 106 can be optimized to eliminate this need. However, it is obviously possible to add further degrees of freedom (pitch or yaw, for example) and complexity to the boom 106 in order to fully maximize robot reach and operations.

As noted, it is clear from the preceding description that the entire on-orbit servicing system 100 may be configured and deployed in different configurations. A first configuration, will simply be with a deployable boom 106 that features capture, docking and refueling mechanisms. In this configuration, the boom 106 will necessarily be actively deployed (springs or motorized). Another configuration which includes the manipulator arm 108 will enable other repairs or activities. However, the docking mechanism may include an electrical connection 132 to the client spacecraft, S2 104 that can be used to perform diagnostic tests, extract or exchange data, etc. Inclusion of the manipulator arm 108 will, necessarily, include a suite of tools; this will enable full functionality for the execution of repairs on the client spacecraft, S2 104.

The following is a description, with related figures, of one specific embodiment of the capturing, and docking systems, reduced to practice and sized for an ESPA-class payload. It should be noted that this disclosure does not limit the invented systems to ESPA-class payload compatibility, and as such, the dimensions noted in the related figures are all subject to change. Each element may be sized according to the requirements of a particular mission and compatibility with the contemplated launch vehicle.

Referring to FIGS. 12-16, various views of the spacecraft servicing system 100, are illustrated. The spacecraft servicing system 100 uses at least three mounting brackets (156, 157, and 159) for demonstration. The capture mechanism 154 is comprised of three electromagnets assembly 174 suspended on a frame that is mechanically grounded to the servicing spacecraft, S1 102. Each electromagnet has a number of turns of magnet wire (typically, copper) wrapped around a yoke. These are attached to an intermediate frame/plate 178 that is separated from a ground frame/plate 176 by three conical (tapered) coil springs or separation springs 172. The intermediate frame/plate 178 is free to move axially with respect to the ground frame/plate 176, compressing the conical springs 172 when it does. The strength of the electromagnet is obviously a function of distance from the striker plate 110; each is designed to hold 3 lb. at capture (that is, a total of 9 lbs at distance zero). The entire capture system is mechanically grounded to the host spacecraft 102 via three struts 164 attached to the ground plate 176.

The docking system 154 is mounted on an X, Y stage 162; each of these axes is driven independently. The stage 162 permits final alignment of the male docking probe (FIG. 12) with the female receptacle, shown in detail in FIG. 6. FIG. 6 also shows the developed design for a "Standard Client Interface" (SCI). The interface includes the BNC-styled receptacle 142 that mates with the docking probe, an electrical connector half 132 that is coupled with the opposite half on the docking interface plate (see FIG. 16), the striker plates for the capture system, and alignment holes that guide the alignment pins 170 during docking in order to compensate for any misalignments along the roll axis.

The docking system 154 has an x-axis actuator 166 and z-axis actuator 160 which drives a leadscrew 158. After capture, docking is accomplished when the docking probe 168 is inserted by the z-axis (vertical) actuation mechanism 160, into the receptacle and rotated. Because of the threaded interface 138 between the receptacle and the housing, rotating the former advances it into the housing by distance, x. Distance x is also the nominal spacing between the intermediate 178 and ground plates 176; thus, the conical springs are compressed by this same distance during docking. The movement, x, is also intended to produce internal actuations on the client spacecraft, S2 104, specifically, opening of a port(s) in order to form a continuous, leakproof, path for refueling (note that the docking probe has a through hole or alignment pin hole 134 that can form a part of the delivery path). Further, the rear side of the docking system 154 includes a docking interface plate 180 having a D-sub 9 pin connector 182 which is merely representative of an electrical connector, and one or more alignment pins 170.

To unlock or separate the two spacecrafts (102 and 104) following on OOS activity, the docking probe is rotated in the reverse direction which resets the internal mechanisms on the client spacecraft, S2 104, this is the position shown in detail B of FIG. 6. The compressed conical springs exert a force on the client spacecraft, S2 104, thus, enabling the physical separation of the two spacecrafts (102 and 104) as distance x is traversed. Finally, the docking probe is retracted to its stowed position by using the mechanisms of the z-axis actuator 160.

In one embodiment, the system 100 that utilizes capture and docking mechanisms for spacecrafts. The capturing mechanism and docking mechanism are explained in detail as follows:

Capture:

In order for any servicing to occur, the host spacecraft S1 102 needs to first capture the client spacecraft, S2 104. For this purpose, the host spacecraft 102 carries a deployable appendage that may be configured as a boom 106, with a few degrees of freedom, or a robotic arm 108 that has many (6 or more) degrees of freedom. In a first embodiment, the capture and docking mechanisms are integrated near the end of the boom 106 which means that the robotic arm 108 may or may not be present on the host spacecraft S1 102. If the robotic arm 108 is present, a scaled-down version of the capture mechanism 200 may be used as an end-effector; this will enable grasping and manipulation of the client spacecraft, S2 104, or elements of it. In a second embodiment, the boom 106 is boom but it only contains or carries the docking mechanisms. The capture mechanism 200 will be an end-effector which requires a robotic arm 108. In a third embodiment, both the capture and docking mechanisms (200 and 214) form an end-effector; this will also necessarily require a robotic arm 108.

Figure 17:
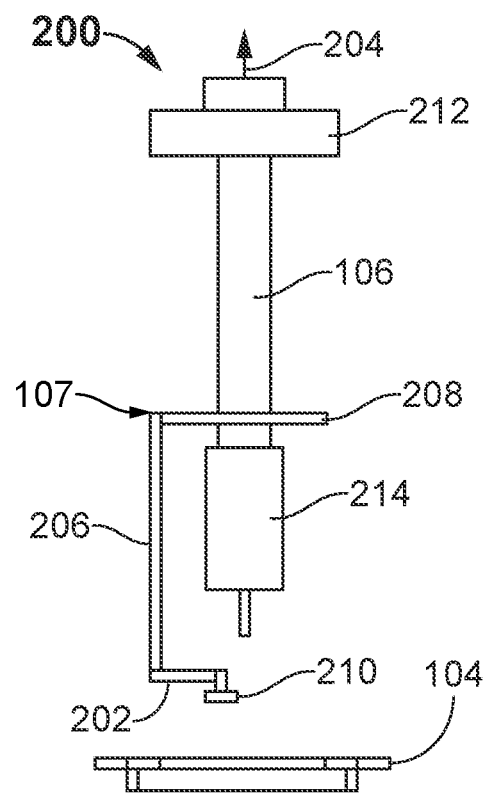
FIG. 17 shows a schematic layout of both capture and docking mechanisms that are mounted on an X, Y stage in one embodiment of the present invention.

Referring to FIG. 17, a schematic layout of a capture mechanism or capture system 200 and docking mechanism 214 that are mounted on an X, Y stage 212, is illustrated. The capture mechanism 200 is provided at the end of the boom 106. The capture mechanism 200 is comprised of a plurality or array of capture arms 202 attached to a grounding structure 204. In one embodiment, the capture mechanism 200 may include at least three arms 202 to capture a circular object. In one embodiment, the capture mechanism 200 may include at least four arms 202 to capture both circular and square objects. The arms 202 are free to rotate with respect to the grounding structure 204; this may be accomplished by a single actuator or motor driving a gear that, in turn, drives smaller gears that are coupled to the arm shafts 206. This configuration synchronizes rotation of the arms 202 such that for any angular displacement of a driver gear 208, the driven gears and arm shafts 206, and thus the arms 202, form a circle that is concentric with the driver gear 208. The driver gear 208 may be internal or external, and of any of the standard types, that is, spur, helical, bevel, a worm and gear, or a combination of these types. The driver gear 208 need not be fully toothed around its pitch diameter, depending on the gear ratios used in the system 100, only toothed segments may be needed.

Furthermore, all or some of the gears may be replaced by mechanisms that achieve the same kinematic link 107 between the driven elements and the driver; for example, sprockets and chain, pulleys and belts, etc. All subsequent references to "gears" are intended to include any form of achieving the kinematic link 107. In a second embodiment, the arms 202 may be independently driven, each by its own actuator/motor (160, 166). In a third embodiment, the arms 202 may be driven by a combination of the aforementioned. As an example of the latter, third, embodiment, if there are three arms 202, two may be driven synchronously by a driver gear 208 and the third arm 202 may be driven independently by its own actuator/motor (160, 166). When driven independently, rotation of the arms 202 may or may not be synchronized; the latter may be preferred for grasping irregularly-shaped structures.

In a fourth embodiment, at least one arm 202 is spring-loaded to deploy and hard stop in a predetermined position, such that it acts as a human thumb in a grasping configuration. Finally, for the permanent installation of one object on another, for example, an avionics box on a spacecraft, the capture arms 202 may simply be spring-loaded; when released from the stowed position, the spring loading will drive the arms 202 to grasp the object. The arms 202 may be released or unlatched actively, pyrotechnically, for example, or passively, by contact with an external feature(s).

Figure 19:
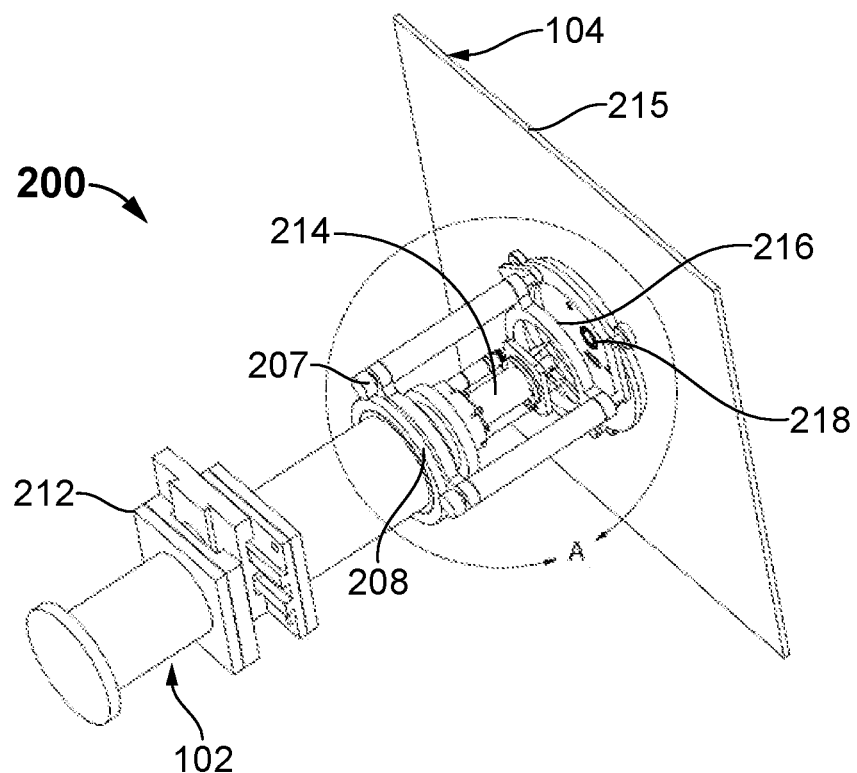
FIG. 19 shows a perspective view of the capture system in one embodiment of the present invention.
Figure 20:
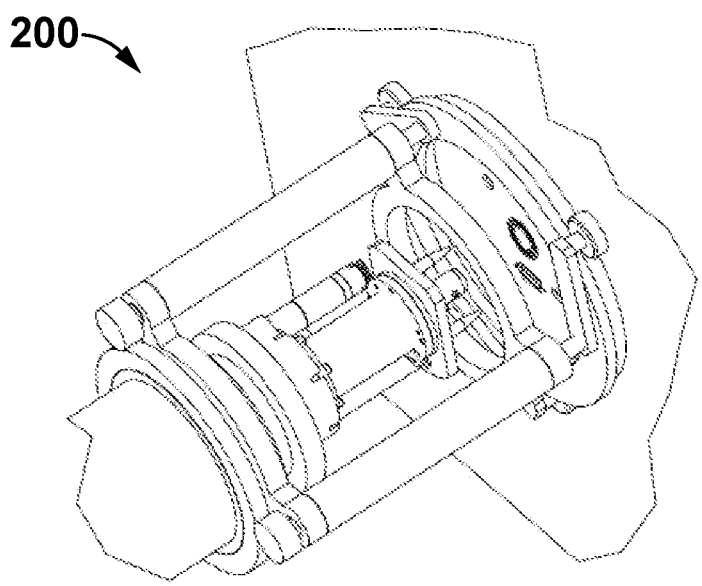
FIG. 20 shows an enlarged view of the capture system in one embodiment of the present invention.
Figure 21:
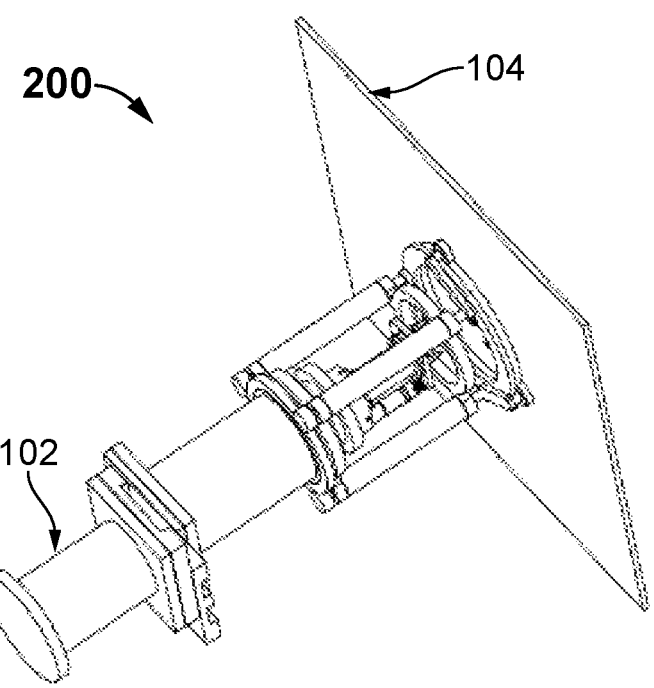
FIGS. 21-22 show various view of the capture system, externally in one embodiment of the present invention.
Figure 22:
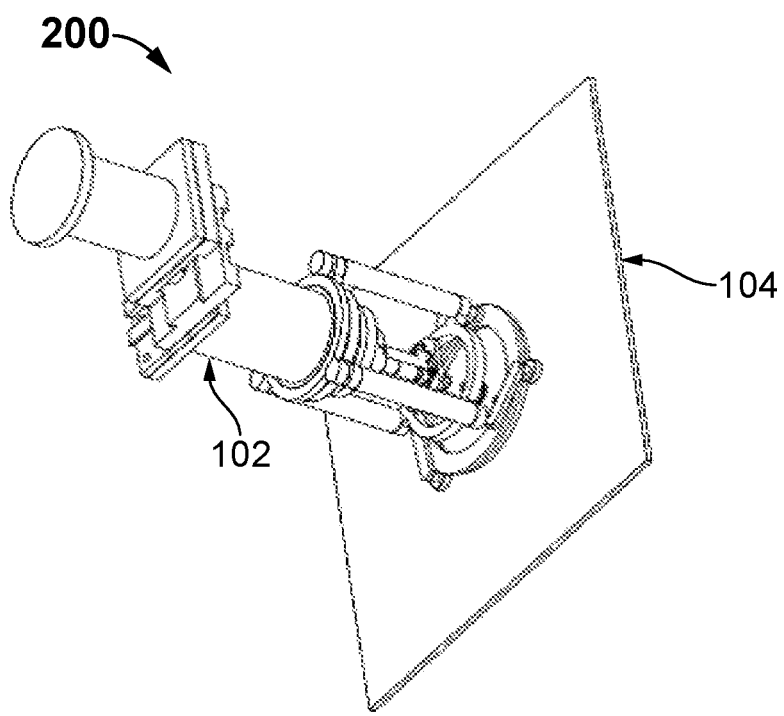
Figure 23:
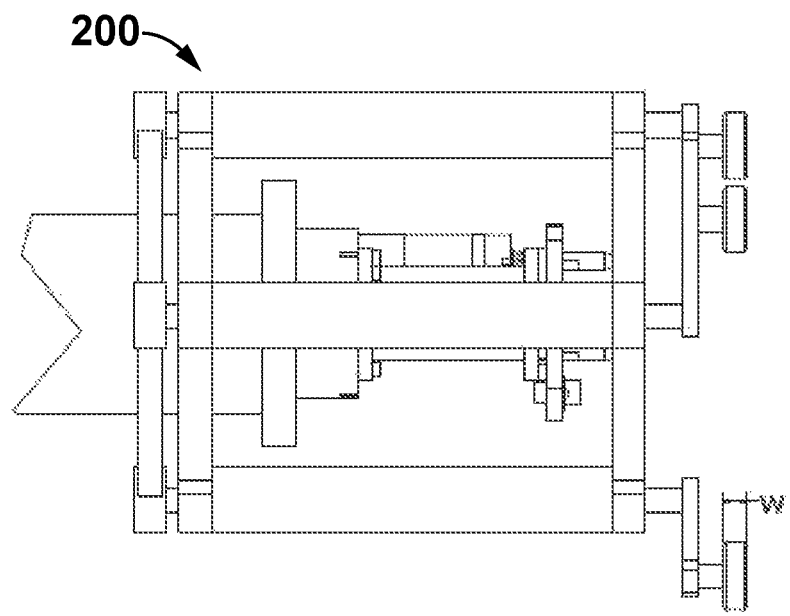
FIG. 23 shows a cut-section of the capture system in one embodiment of the present invention.
Figure 24:
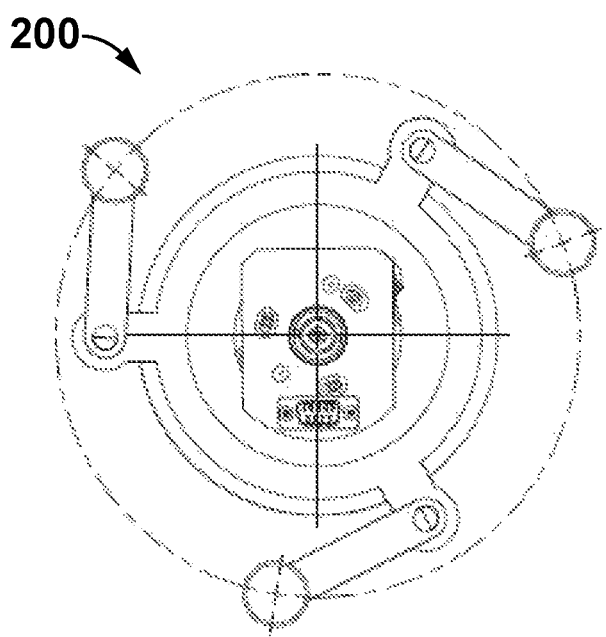
FIGS. 24-25 show an end view of the capture system showing concentricity with docking features, when synchronized in one embodiment of the present invention.
Figure 25:
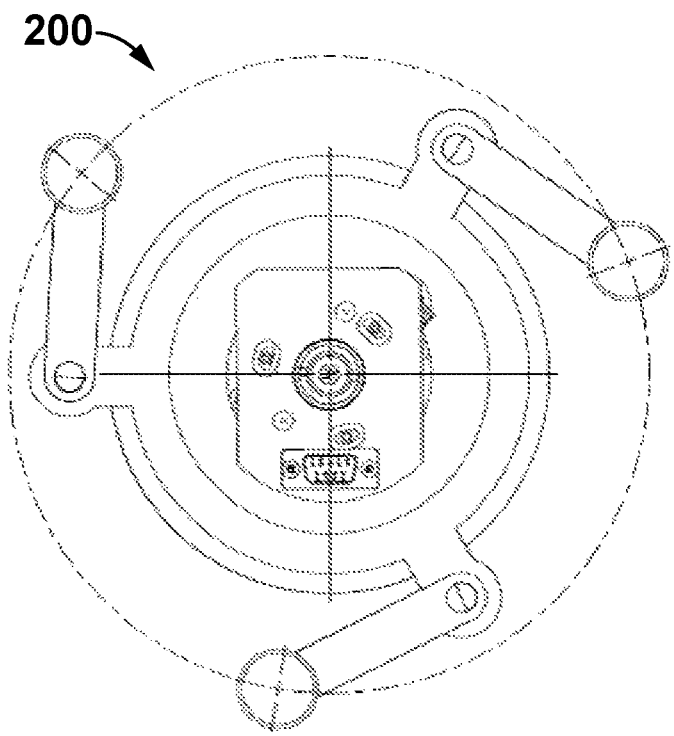
Figure 26:
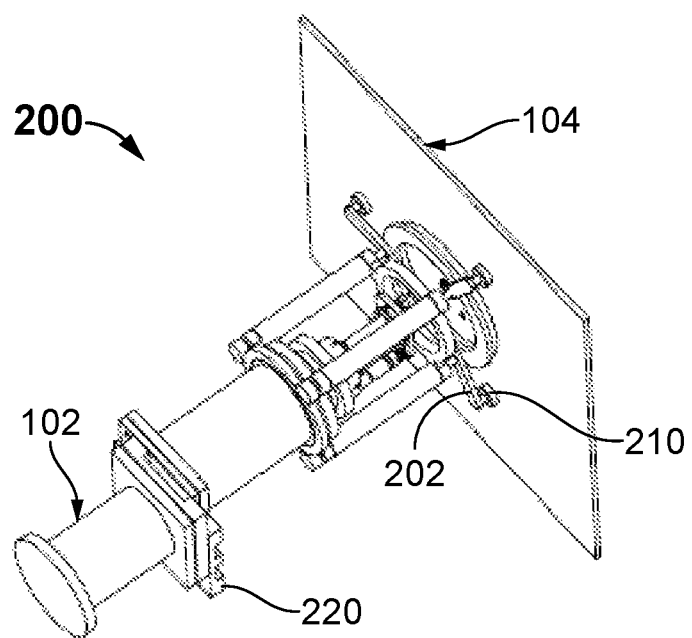
FIGS. 26-27 show various views of the capture system prior to capturing in one embodiment of the present invention.
Figure 27:
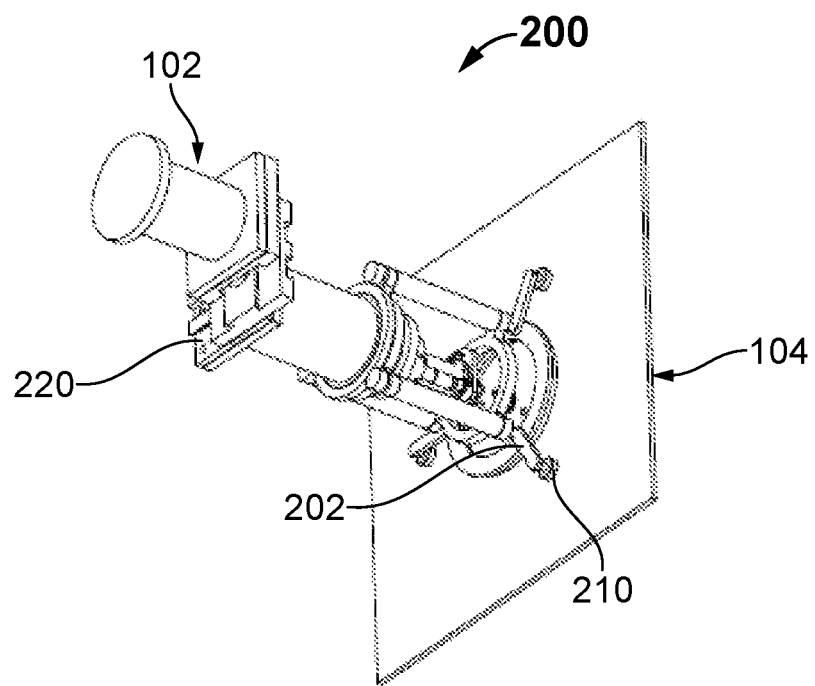
Figure 28:
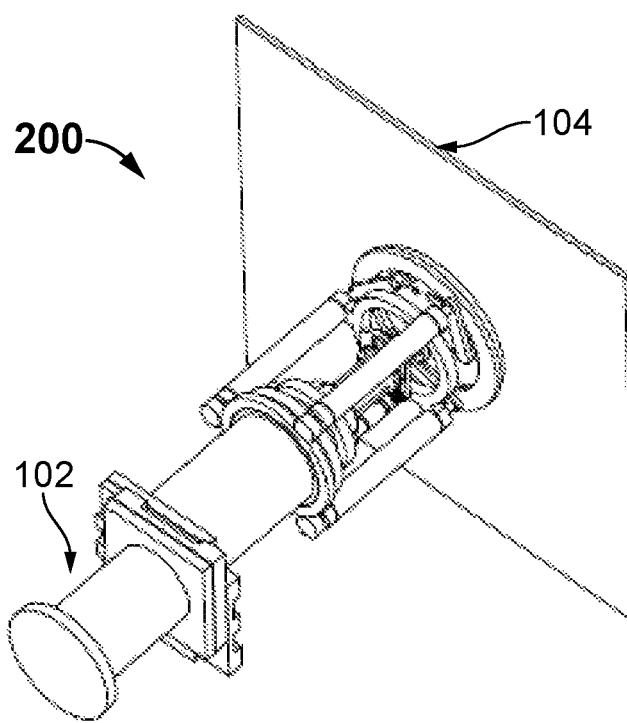
FIGS. 28-29 show various views of the capture system, internally in one embodiment of the present invention.

The length of the capture arms 202 is sized based on the dimensions of the object to be grabbed, and the amount of gripping force to be exerted on it, for a given motor/actuator. Increasing the length of the arms 202 obviously increases the size of objects that can be grasped. The capture arms 202 are provided with one or more features that directly interface or contact with the object to be captured or grasped; these are depicted in figures following as rollers 210 but need not be as the features simply need to come into contact with the object and, in some instances, may conform to the surface being grabbed. Additionally, the features may be designed such that they are capable of grasping an object both externally and internally (as shown in FIGS. 21-22 and FIGS. 28-30). The end of arm features may be compliant to allow for preloaded grasping although this may be inherently designed into the arm 202, itself. Nevertheless, rollers 210 are the preferred contacting feature as they provide the flexibility and versatility of grasping both inside and outside of an object, such as a capture ring 216 (as shown in FIG. 19). Furthermore, the rollers 210 allow for rolling contact as opposed to sliding contact with the object being grasped. The rollers 210, however, may be mounted such that upon application of the grasping force, their center of rotation is offset or made eccentric such that rolling is no longer possible.

In a first embodiment, an assembly is located between the boom 106 and the spacecraft structure that allows for motion in an XY (Cartesian) plane that is perpendicular to the main or longitudinal axis of the boom 106, referring to the schematic of FIG. 17, in which the X-axis is left to right and the Y axis is in and out of the page. This configuration will be preferred when the docking features on the client spacecraft, S2 104 are concentric with the capture feature, for example, a capture ring 216, as shown in FIG. 3. The purpose of this assembly is to compensate for misalignments in the XY plane during capturing. This assembly may be what is commonly referred to as a stage but it is essentially an assembly of motors/actuators, linear motion components and support structure, that provides two independent degrees of freedom that are perpendicular to each other. An alternate method of achieving this compensation capability is by arranging the two axes in an r, 0 (polar) coordinate system such that there is a roll (0) axis about the boom's longitudinal axis and a radial (r) translational axis. When the capture system 200 is used as a basic gripper, that is, an end-effector at the end of the robotic arm 108, it may or may not include this misalignment compensation capability. In the Cartesian configuration, motions in X, and Y, may be effected by small rocket motors instead of electrical motors.

Figure 18:
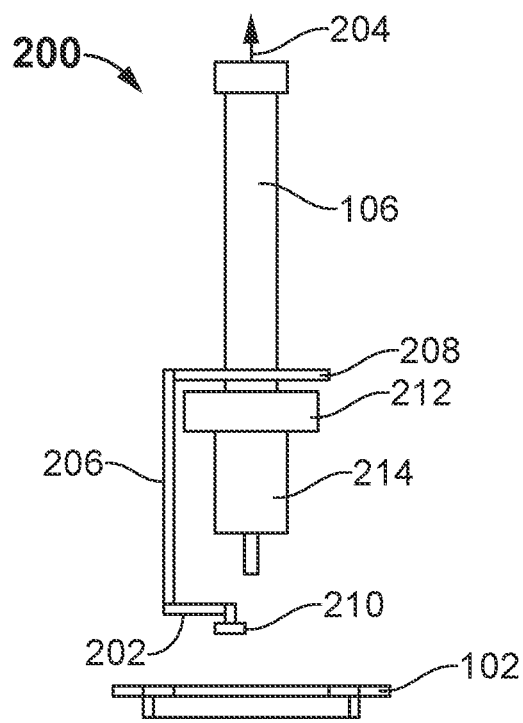
FIG. 18 shows a schematic layout of both capture and docking mechanisms, wherein the docking system is mounted to an X, Y stage in one embodiment of the present invention.

An alternate configuration of the misalignment compensation system is that in which the stage is located such that only the docking mechanisms 214 are mounted on it; this is depicted schematically in FIG. 18. This means that post-capturing, only the docking system 214 will be aligned with features on the client spacecraft, S2 104. This arrangement will be preferred for configurations in which the docking elements or interface are not concentric with the feature that forms the capture interface. For example, referring to FIG. 3, in which the features are concentric, if the docking interface was radially offset from the center of the ring, this would require the misalignment compensation system to re-position only the docking system 214 in order to enable docking. In this alternate configuration, the host spacecraft S1 102 will have to be pre-positioned within the capture zone in order to enable capturing as there will be no misalignment compensation system. Obviously, a second XY compensation system may be used to re-position the capture mechanisms 200 as described below; however, this will increase the complexity and mass of the system.

Referring to FIG. 18, a schematic layout of the capture mechanism 200 and docking mechanism 214, wherein the docking mechanism 214 alone in mounted to an X, Y stage 212, is illustrated. The capture system 200, when used to capture a spacecraft, operates as follows; the sequence (which also includes docking, described further below) is depicted in FIGS. 19-32, following. It is assumed that the state-of-the-art sensor suite allows for rendezvous and proximity positioning of the two spacecrafts in order to enable the following sequence to occur, and that the capture and docking systems 214 are concentric (that is, both can be moved in the XY plane). It is further assumed that the alignment along the roll axis, for both spacecrafts, is within +/−5 degrees or better; again, given the state-of-the-art sensing systems. Also, it will be known beforehand what spacecraft is being grasped, the location, and the physical and geometrical properties of the surface or component to be grabbed. As shown in the figures, the host spacecraft S1 102 approaches the client spacecraft, S2 104 with the capture arms 202 in the stowed position. A vision system, located on the boom 106 (not shown in figures) may be used to locate fiducial marks on S2; the vision system, and markings, will be located in specific quadrant(s) of the planar surface containing the capture ring 216. Once there is no relative motion between the two spacecrafts and they are located within the capture zone, the vision system will record an image of the capture ring 216. This image will be processed in order to determine where the center of the ring 216 is located relative to the center of the capture system 200; this difference will represent the amount of misalignment between the two spacecrafts (102 and 104). This misalignment information will then be sent to the misalignment compensation system which utilizes an algorithm to move the axes in the system in order to center the boom 106 and capture system 200 on the capture ring 216. This process can be done iteratively, and automatically, until the centers of the two systems align, that is, concentric. After this planar alignment is accomplished, the capture arms 202 will be driven to encircle and close around the capture ring 216; thus, fully executing capture. This process ensures that no disorienting impulses are imparted to either spacecraft. However, if this is not a concern, then there is no need for the alignment process to occur, and capture may be executed as long as the capture arms 202 overlap the capture ring 216.

The boom 106 may be deployed by active (motorized, springs; not shown in figures) or a passive means. The latter can only occur if the servicing craft includes a manipulator arm, described later, which will be used to deploy the boom 106. In all scenarios, once the boom 106 is deployed, it is locked or latched in position (these features are not depicted in the figures).

To complement the vision system, the capture arms 202 may include proximity sensors that are capable of detecting the edges of the capture ring 216. When the two spacecrafts are in the capture zone, the capture arms 202 (proximity sensors included) can be used to sweep across the plane of the capture ring 216, detecting the edges of the ring, as they pass over them. This information can then be used to help map or confirm the location of the center of the capture ring 216, relative to the center of the boom 106. Additionally, the capture arms 202 may be instrumented with strain gages in order to provide force/torque feedback to S1 controllers.

Docking:

In the preferred embodiment, in addition to the capture mechanism 200, also located on the boom 106 is a mechanism that enables the host spacecraft, S1 102 to dock with the client spacecraft, S2 104; this is separate from the capture mechanism 200. Docking is accomplished when the boom 106 on the host spacecraft, S1 102 is engaged with an interface on S2; this interface may be concentrically located with the center of the capture ring 216 but an offset 220 is also possible, as previously noted. The docking mechanism 214 may have up to five actuators and is normally recessed below the plane of the capture arms 202 of the capture mechanism 200, in the stowed position. There is an axial translation motion, along the length of the boom 106 (a Z-axis), the second, which may be eliminated, is a rotation or roll about the same axis. The third and fourth are orthogonal translational movements in a plane (X, Y) that is perpendicular to the roll axis; if the system is configured as such (disclosed in the Capture section). The fifth actuator or motion rotates the host spacecraft, S1 102 coupling half during the docking process. Post-capture, the axial translational motion drives the docking or coupling mechanism into a position beyond the plane of the capture mechanism 200, as shown in the figures, in which it engages with the other half of the docking mechanism on the client spacecraft, S2 104. When it is included, the manipulator arm on the host spacecraft, S1 102 may position the client spacecraft, S2 104 for docking, after it has been captured; this assumes that the system is configured such that the docking mechanism 214 is independent of the capture mechanism 200. There are a number of ways in which the vehicles can be docked or held together, for example, using spring loaded detents or latches that, potentially, also interface with the gap g, of FIG. 36 or any of the peripheral structures of the capture plate. The preferred approach, however, is to use a bayonet-styled coupling system (as in a BNC connector). The bayonet connection can also be designed to permit the transfer of torques to roll the client spacecraft, S2 104 about the longitudinal axis of the boom 106, if this feature is desired. This, in turn, will permit the boom 106 to position the periphery of the client spacecraft, S2 104 in any location to facilitate a repair task by the manipulator arm.

Figure 29:
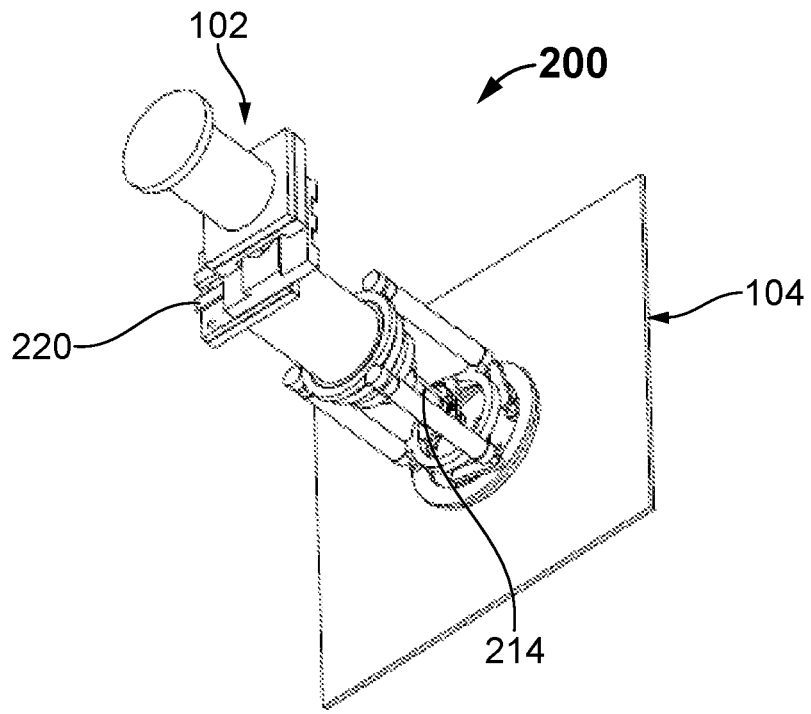
Figure 30:
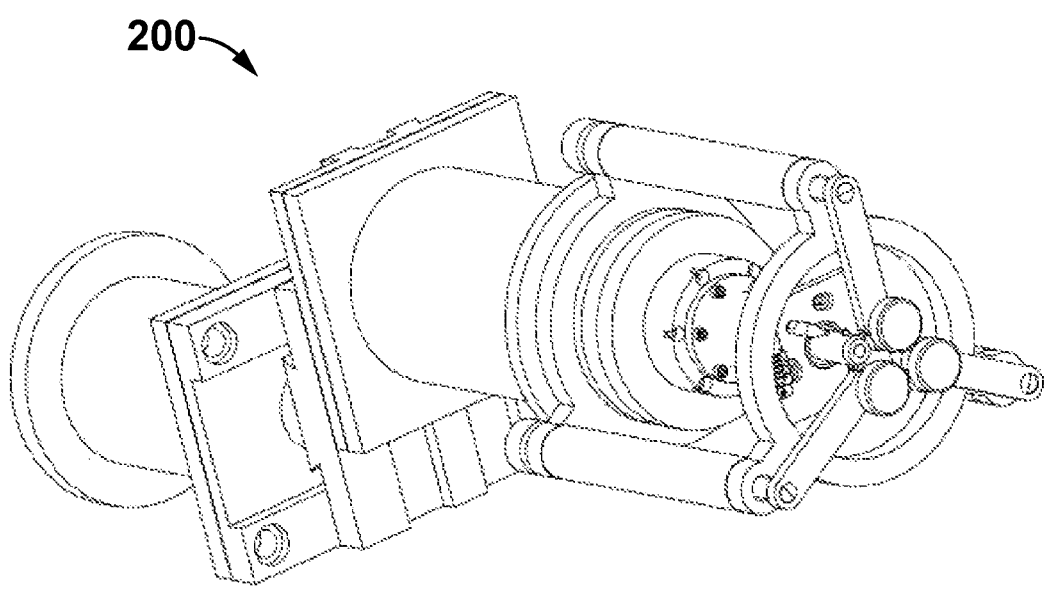
FIG. 30 shows the capture system with arms in stowed position in one embodiment of the present invention.
Figure 31:
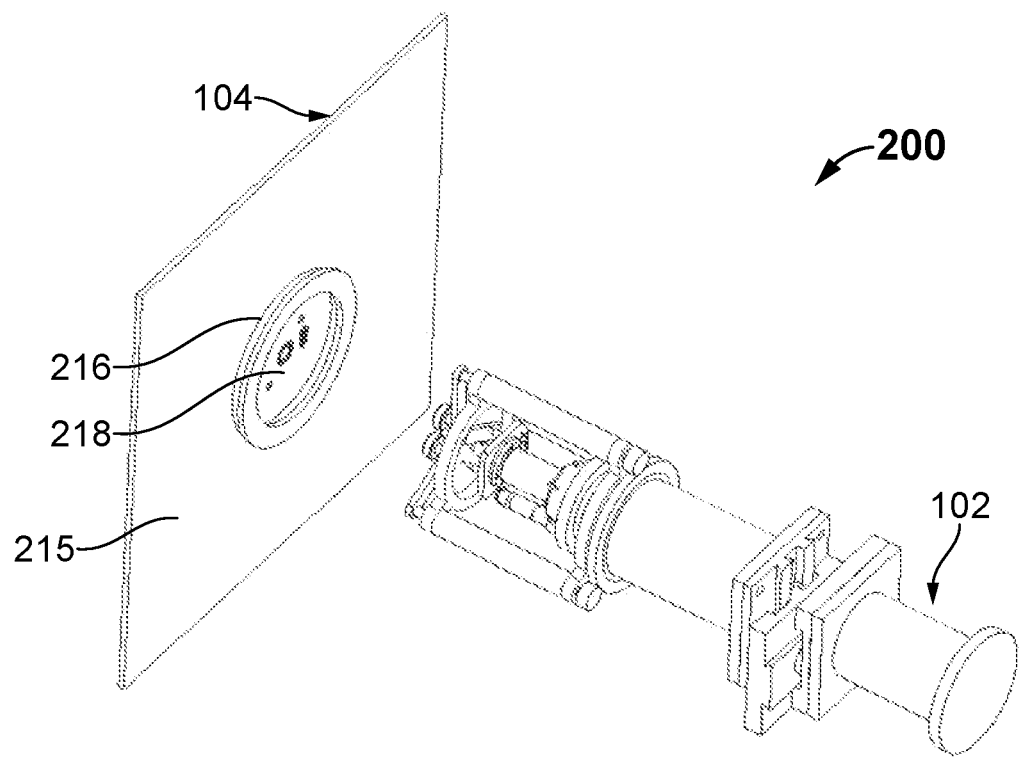
FIGS. 31-32 show various views of the capture system with arms in stowed position approaching client spacecraft in one embodiment of the present invention.
Figure 32:
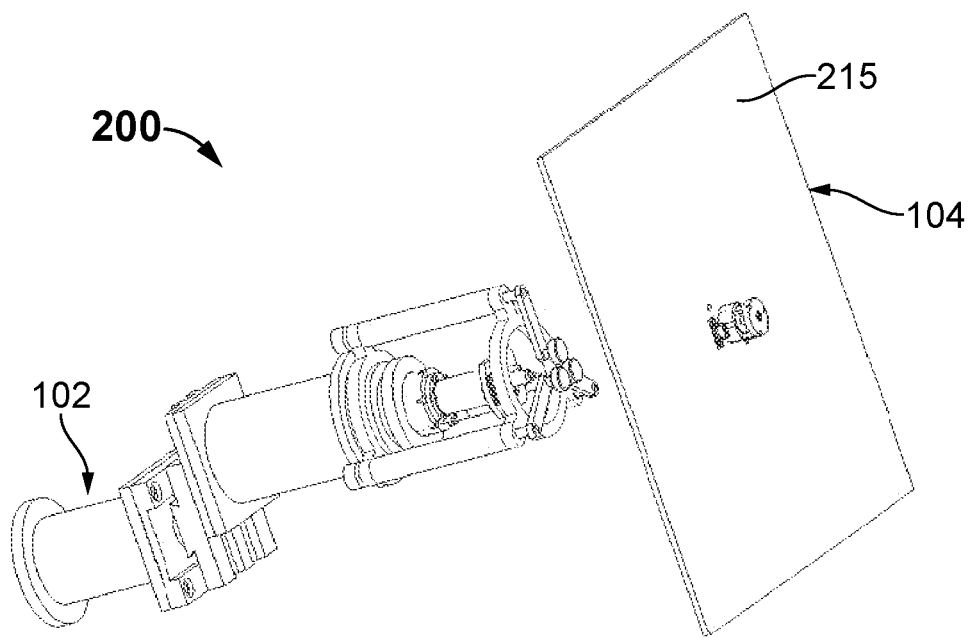
Figure 33:
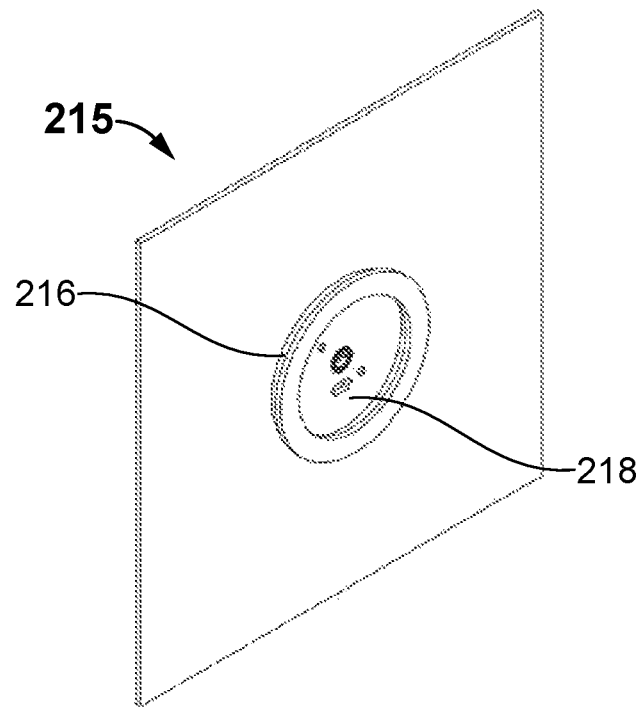
FIG. 33 shows an external view of the standard client spacecraft interface in one embodiment of the present invention.
Figure 34:
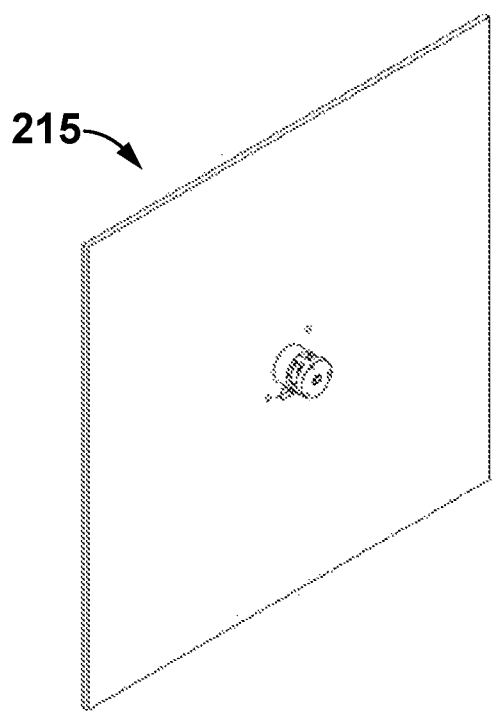
FIG. 34 shows an internal view of the standard client spacecraft interface in one embodiment of the present invention.
Figure 35:
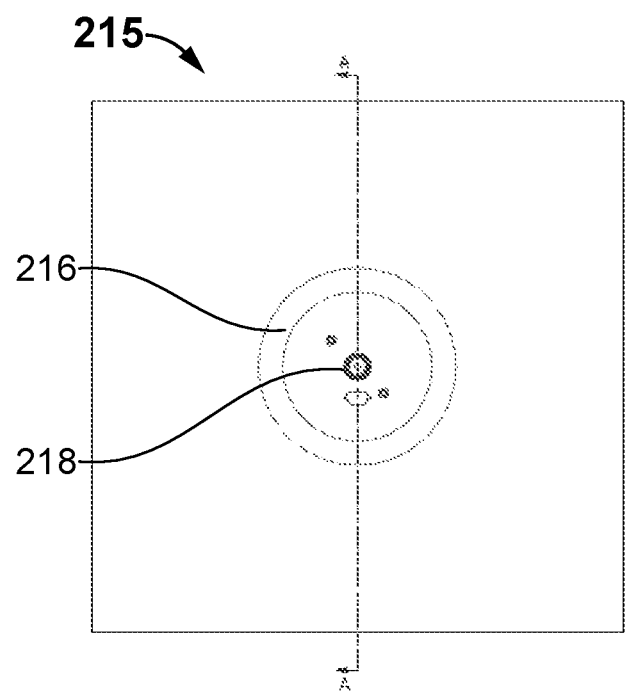
FIGS. 35-37 show various views of the standard client spacecraft interface in one embodiment of the present invention.
Figure 39:
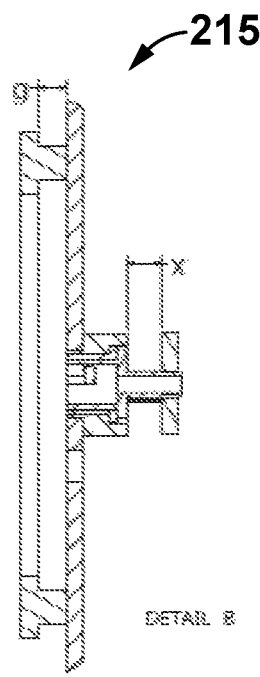
Figure 40:
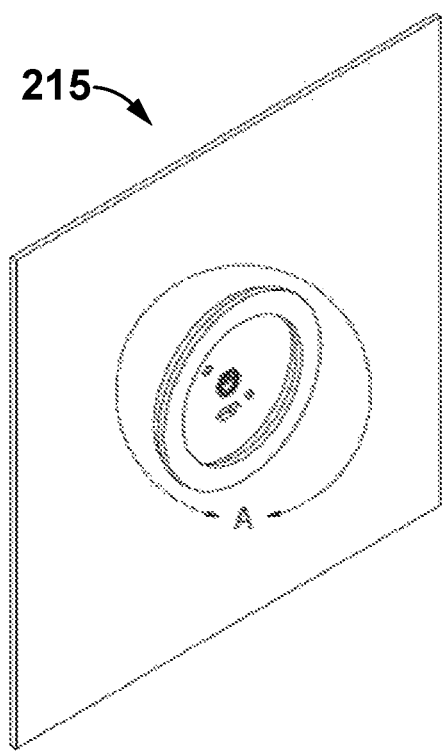
FIGS. 40-41 show enlarged views of the interface and detail A in one embodiment of the present invention.
Figure 41:
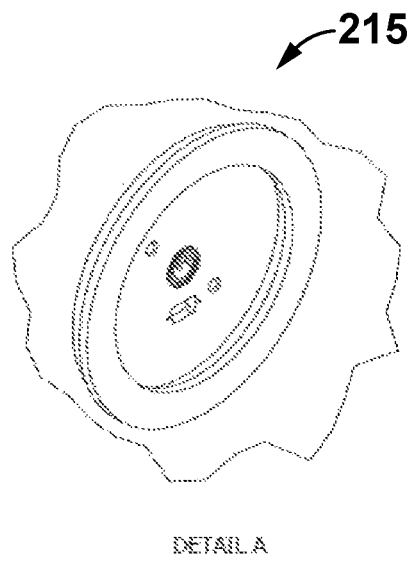
Figure 42:
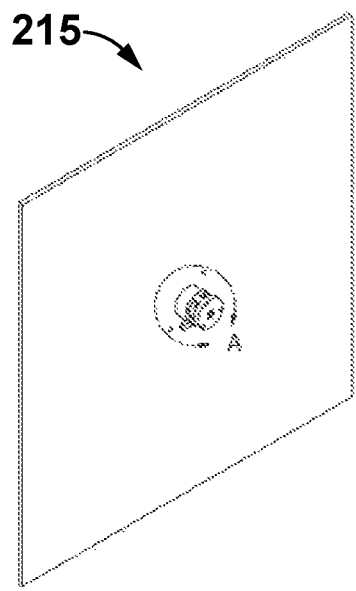
FIGS. 42-43 show internal views of the interface and detail A in one embodiment of the present invention.
Figure 43:
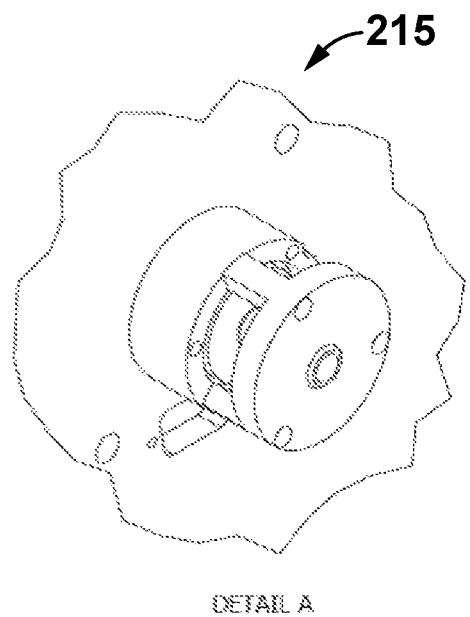

Internal to the bayonet-styled connection are additional mechanisms; specifically, rotation of the host spacecraft, S1 102 coupling half during docking will produce motion internal to the coupling half of the client spacecraft, S2 104 which could be a cam/follower action or more simply, a nut and threaded stud engagement; see detail "B", FIG. 39. These relative motions will be used to, potentially, mate connectors, but more specifically, to open port(s) and a fully mated, leakproof, connection that enables refueling of the client spacecraft, S2 104. One way to transfer fuel across the connection would be by centrally locating, in the docking mechanism, a means of connecting to a refuel supply line on the client spacecraft, S2 104. This line will be flexible, for example, a hose, or otherwise be articulated in order to enable the boom 106 to be stowed. In this arrangement, there will be no need to separately manage a refueling hose or the like which further reduces complexity and mass. A possible implementation of the docking mechanism 214, on the host spacecraft, S1 102 as shown in FIG. 29.

Figure 36:
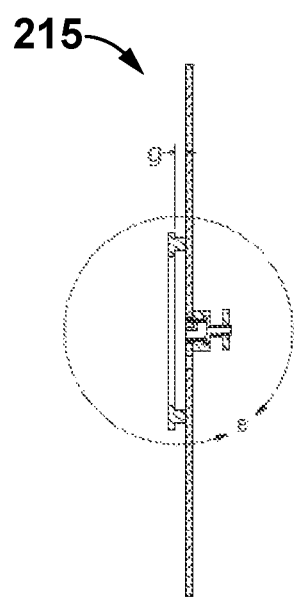
Figure 37:
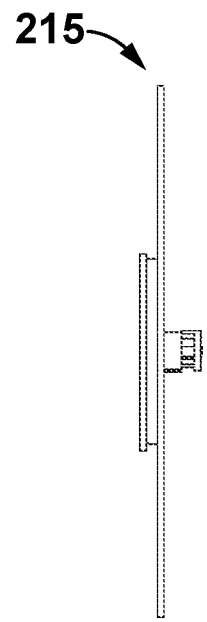
Figure 38:
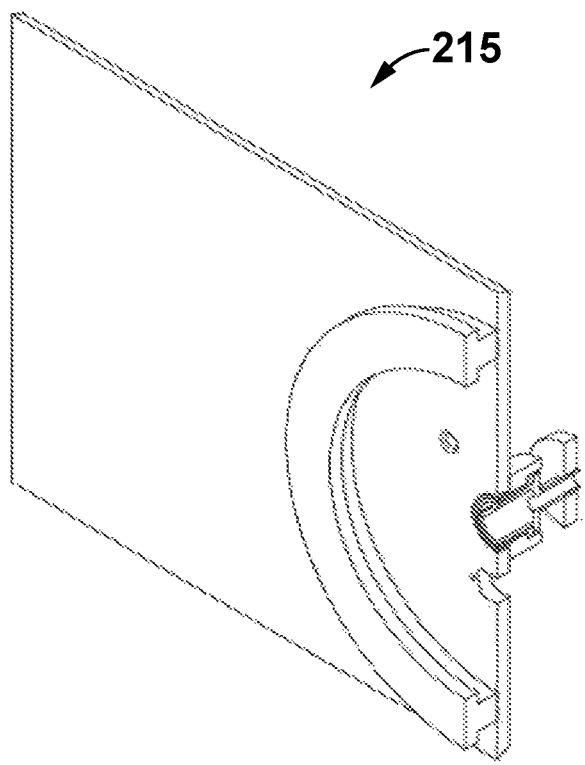
FIGS. 38-39 show enlarged views of detail B in one embodiment of the present invention.

Standard Capture/Docking Interface:

Referring to FIGS. 33-43, various views of the docking interface plate 215, are illustrated. As noted above, capturing of the client spacecraft, S2 104 by the host spacecraft, S1 102 is accomplished by an interface located on the client spacecraft, S2 104. This interface could be made into a standardized feature on spacecrafts in order to allow for the possibility of on-orbit servicing. In one embodiment, the interface includes three discrete pads with an axial offset 220 "g" as shown in FIG. 36, equally spaced in an array and concentric with the docking interface. The pads may be ferromagnetic in order to be compatible with an electromagnetic capturing system 200. The dimensions of the pads are determined so as to allow capturing with the maximum possible misalignment between the two spacecrafts, that is, within the capture envelope or zone. The capture envelope, in turn, is determined by the sensor system used to rendezvous and bring the spacecrafts together for proximity operations, and the ability to control movements of the servicing spacecraft, S1 102.

The pads, or annular ring, will be offset 220 to project from the plane of the spacecraft's structure, distance "g" in FIG. 36, they are mounted on; in this configuration, the gap ":g" between the pad and the structure creates an interface for capturing. The annular ring may be the separation ring that is typically located on spacecrafts to allow separation from a launch vehicle system. Specifically, the disclosed capture mechanism 200, with rollers at the end of the capture arms 202, can be inserted into the space between the pads and the spacecraft structure, once they are below the capture surface and in gap g, between the pads and spacecraft, rotating the arms 202 will essentially capture the spacecraft. Additional rotation of the arms 202, will preload the connection between the two spacecrafts. This feature may be particularly useful to permanently attach a payload, an avionics box, for example, to spacecraft S2 104. If the capturing mechanism 200 is to be only compatible with the disclosed mechanism, then there is no need for a ferromagnetic, striker plate (that is, pads), and the only features that matter are those that will enable the grappling mechanism to interface and lock.

The features of FIGS. 33-43 form the design for a "Standard Client Interface" (SC) 215. The interface 215 includes: the BNC-styled receptacle that mates with the docking probe, an electrical connector half that is coupled with the opposite half on a docking interface plate 215. The docking interface plate 215 includes the capture ring or pads 216, a plurality of interface components 218, and one or more alignment holes that guide the alignment pins during docking in order to compensate for any misalignments along the roll axis; the several, opposite, interfaces for the host spacecraft, S1 102 as shown, in one possible configuration. Detail B, of FIG. 39, shows a cross-section of the docking elements on the client spacecrafts, S2 104. After capture, docking is accomplished when the probe is inserted by the Z-axis actuation mechanism, into the receptacle, and rotated. Because of the threaded interface between the receptacle and the housing, rotating the former advances it into the housing by distance, x; this is the distance that draws the two spacecrafts together. The movement, x, is also intended to produce internal actuations on the client spacecraft, S2 104, specifically, opening of a port(s) in order to form a continuous, leakproof, path for refueling. The docking probe has a through hole that can form a part of the delivery path.

To unlock or separate the two spacecrafts following an OOS activity, the docking probe is rotated in the reverse direction which resets the internal mechanisms on S2, this is the position shown in detail B of FIG. 39. Springs, mounted on the host spacecraft, S1 102 but in contact with the client spacecraft, S2 104, may be used to exert a force on the client spacecraft, S2 104, thus, aiding the physical separation of the two spacecrafts as distance x is traversed. Finally, the docking probe is retracted to its stowed position by using the mechanisms of the Z-axis.

According to the present invention, the disclosed capture system 200 and docking system 214 include, but not limited to the following advantages. The systems do not use any permanent magnets or electromagnets. They are actively and possibly, passively (with compliance) self-aligning. The active self-alignment does not impart any disorienting forces to either spacecraft. They have possible wider range of capture/grab diameters. They do not require any guidance cones. They can capture/grab on internal or external surfaces. They will grab the nozzle of a thruster engine. They can capture/grab irregular shaped objects if capture arms 202 are driven independently or in a combination of dependent and independent drives. They can be configured in a few different ways, including as an end-effector. In addition, the misalignment compensation system may be polar coordinates based rather than cartesian; the former may be better when the client spacecraft docking interface 218 is not concentric with the capture ring 216. The system may include no docking mechanism 214 which could be end-effector when a robot arm is available. Further, spring-loaded capture arms 202 may be used for permanent installation of an object, for example, avionics box, to spacecraft structure.

Preferred embodiments of this invention are described herein, including the best mode known to the inventors for carrying out the invention. It should be understood that the illustrated embodiments are exemplary only and should not be taken as limiting the scope of the invention.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A host or servicing spacecraft system configured to perform servicing activities on-orbit, the spacecraft system comprising a capture mechanism to grasp a client spacecraft, a docking mechanism to structurally integrate the two spacecrafts post capturing, and a robotic arm, equipped with a suite of changeable end-effectors to perform repair or manipulation tasks, post capturing and docking, wherein: the capture and docking mechanisms are mounted on the distal end of a deployable boom with said boom having at least one degree of freedom, relative to the servicing spacecraft, to permit a stowed configuration for launch with said at least one degree of freedom fixed, relative to the servicing spacecraft, following boom deployment on-orbit; wherein the capture mechanism is comprised of a plurality of capture arms structurally fixed to the boom, wherein a free end of each capture arm can rotate or pivot with respect to the boom about an axis that is parallel to the longitudinal axis of the deployed boom, and kinematically linked to each other so as to be driven by at least one actuator, synchronize the rotation of the arms for any angular displacement of the actuator, and to enable grasping, with the free end of the capture arms deployed to grasp a capture ring or other structure; wherein, prior to approaching a client spacecraft, the capture arms are deployed from the launched or stowed position to their maximum grasping envelope to avoid inadvertent contact that will induce disturbing forces between the spacecrafts prior to fully grasping or capturing the client spacecraft; wherein the docking mechanism can axially translate with respect to the capture mechanism and is comprised of a probe with Bayonet Neill-Concelman (BNC)-styled features: at least one electrical connector half mounted on a docking interface plate; and one or more alignment pins to compensate for misalignment and react torque on a roll axis through the probe.

2. The spacecraft system of claim 1, wherein the capture mechanism is mounted on the distal end of the boom,
with said capture mechanism comprising two sets of capture arms attached to the boom, wherein one end of each capture arm is free to rotate with respect to the longitudinal axis of the boom and the first set is kinematically linked to the other so as to be driven by at least one actuator, and the second set is also kinematically linked to be driven by a second actuator, independent of the first, such that the rotation of each set of arms is independently synchronized for any angular displacement of the respective actuator, to enable gripping in circular, non-circular, and irregular grasping geometries of varying dimensions.

3. The spacecraft system of claim 1, wherein an assembly located between the boom and a spacecraft structure allows for independent motion in an XY (Cartesian) plane that is perpendicular to the main or longitudinal axis of the boom to compensate for misalignments in the XY plane during capturing and docking, wherein said compensation can occur autonomously or semi-autonomously, or
an alternate assembly wherein said alternate assembly wherein said alternate assembly having an arrangement with two axes in an r, Θ (polar) coordinate system such that there is a roll (Θ) axis about the booms longitudinal axis and a radial (r) translational axis.

4. The spacecraft system of claim 1, wherein the manipulator or robotic arm is mounted directly to the host spacecraft structure.

5. The spacecraft system of claim 1, in which the docking system in a stowed position is recessed proximally with respect to the plane of the capture arms and mounted on an assembly at the distal end of the boom that allows for independent motion in an XY (Cartesian) plane that is perpendicular to the main or longitudinal axis of the boom, to compensate for misalignments in the XY plane during docking, wherein said compensation can occur autonomously or semi-autonomously, or
an alternate assembly wherein said alternate assembly wherein said alternate assembly having an arrangement with two axes in an r, Θ (polar) coordinate system such that there is a roll (Θ) axis about the booms longitudinal axis and a radial (r) translational axis.

6. The client spacecraft of claim 1, comprising a standard client (SCI) interface having a BNC-styled receptacle to mate with the docking probe;
an electrical connector half to couple with the opposite half on the docking interface plate;
the capture ring to be grasped by the capture arms,
and one or more alignment holes to guide one or more alignment pins during docking to compensate for any misalignment along a roll axis, and to react torque loads during the docking process.

7. The capture mechanism of claim 1, wherein the capture ring's dimensions are determined to allow capturing with the maximum possible misalignment between the two spacecrafts within a predefined capture envelope or zone.

8. The capture mechanism of claim 1, wherein the capture envelope is determined by a sensor system used to rendezvous and bring the spacecrafts together for proximity operations, and the ability to control movements of the servicing spacecraft.

9. The spacecraft system of claim 1, wherein the suite of end-effectors includes one that ins configured with all the features of the capture mechanism.

10. The spacecraft system of claim 1, wherein the suite of end-effectors includes one that ins configured with all the features of the docking mechanism.

11. The spacecraft system of claim 1, wherein the free end of the capture arms are formed to conform to the surface being grasped, or to attach a rolling element so as to permit relative rotations between the two spacecrafts during and after capturing.

12. The spacecraft of claim 1, wherein rotations of the BNC-styled coupling, post insertion and engagement with the client spacecraft's receptacle, produce relative motion internal to the coupling half of the client spacecraft during docking, said motion allowing for mating of the connector halves to enable electrical continuity between the spacecrafts, and a leakproof connection to enable fuel transfer to the client spacecraft.

13. The spacecraft system of claim 1, wherein the at least one actuator is driven by an electrical machine.

14. The spacecraft system of claim 1, wherein the kinematic link is a system of gears.

15. The spacecraft system of claim 1, wherein the kinematic link between the capture arms is comprised of flexible drive elements such as a pulley and belt system, or a toothed sprocket and chain system.

16. The spacecraft system of claim 1, wherein the capture arms are kinematically connected by linkages.

17. The spacecraft system of claim 1, wherein the at least one actuator is a spring.

18. The spacecraft system of claim 1, wherein the at least one of said capture arms is independently spring-loaded to act as a reaction member.

* * * * *